United States Patent [19]
Ozue et al.

[11] Patent Number: 5,852,534
[45] Date of Patent: Dec. 22, 1998

[54] TAPE CASSETTE, TAPE RECORDING APPARATUS AND TAPE REPRODUCING APPARATUS

[75] Inventors: Tadashi Ozue; Yoshihisa Takayama, both of Kanagawa, Japan

[73] Assignee: Sony Corporation, Tokyo, Japan

[21] Appl. No.: 776,646

[22] PCT Filed: Jun. 28, 1996

[86] PCT No.: PCT/JP96/01804

§ 371 Date: Feb. 7, 1997

§ 102(e) Date: Feb. 7, 1997

[87] PCT Pub. No.: WO97/02566

PCT Pub. Date: Jan. 23, 1997

[30] Foreign Application Priority Data

Jun. 30, 1995 [JP] Japan ................................. 7-166636
Feb. 29, 1996 [JP] Japan ................................. 8-067520

[51] Int. Cl.$^6$ ..................................................... G11B 15/18
[52] U.S. Cl. ............................ 360/69; 360/72.1; 360/134
[58] Field of Search ............................... 360/69, 71, 72.1, 360/73.04, 73.13, 74.5, 25, 131, 132, 134, 33.1, 39, 55

[56] References Cited

FOREIGN PATENT DOCUMENTS 4286791A 10/1992 Japan .

*Primary Examiner*—Muhammad N. Edun
*Attorney, Agent, or Firm*—Jay H. Maioli

[57] ABSTRACT

A tape cassette and tape recording/reproducing apparatus including a tape partitioned into a plurality of partitions for recording data thereon, and a separate memory included in the tape cassette for storing control information relating to each tape partition, thereby reducing the time and number of operations needed to access a particular partition.

12 Claims, 28 Drawing Sheets

| | | |
|---|---|---|
| Raw Format ID | | 16bit |
| Logical Format ID | | 8bit |
| Logical Frame ID | Last Frame ID | 1bit |
| | ECC Frame ID | 1bit |
| | Logical Frame Number | 6bit |
| Partition ID | | 16bit |
| Area ID | | 4bit |
| Data ID | | 4bit |
| N-Position | | 4bit |
| N-Repeats | | 4bit |
| Group Count | | 24bit |
| File-mark Count | | 32bit |
| Save-Set Mark Count | | 32bit |
| Record Count | | 32bit |
| Absolute Frame Count | | 24bit |
| Reserved | | |

FIG.28

| bit 3210 | Definition |
|---|---|
| 0000 (0) | Device Area |
| 0001 (1) | Reference Area |
| 0010 (2) | System Log Area |
| 0011 (3) | Reserved |
| 0100 (4) | Data Area |
| 0101 (5) | EOD Area |
| 0110 (6) | Reserved |
| 0111 (7) | Option Device Area |

FIG.29

|  | EOD AREA | | | | | | | |
|---:|---|---|---|---|---|---|---|---|
| Raw Format ID | 0 | 0 | 0 | ⋯ | 0 | 0 | 0 | 0 |
| Format ID | 0 | 0 | 0 | ⋯ | 0 | 0 | 0 | 0 |
| Logical Frame No. | 0 | 0 | 0 | ⋯ | 0 | 0 | 0 | 0 |
| Last Frame ID | 0 | 0 | 0 | ⋯ | 0 | 0 | 0 | 0 |
| ECC Frame ID | 0 | 0 | 0 | ⋯ | 0 | 0 | 0 | 0 |
| Logical Frame Number | 0 | 0 | 0 | ⋯ | 0 | 0 | 0 | 0 |
| Partition ID | 0 | 0 | 0 | ⋯ | 0 | 0 | 0 | 0 |
| Area ID | 5 | 5 | 5 | ⋯ | 5 | 5 | 5 | 5 |
| Data ID | 0 | 0 | 0 | ⋯ | 0 | 0 | 0 | 0 |
| N-Position | 0 | 0 | 0 | ⋯ | 0 | 0 | 0 | 0 |
| N-Repeats | 0 | 0 | 0 | ⋯ | 0 | 0 | 0 | 0 |
| Group Count | 0 | 0 | 0 | ⋯ | 0 | 0 | 0 | 0 |
| File-mark Count | 0 | 0 | 0 | ⋯ | 0 | 0 | 0 | 0 |
| Save-set Mark Count | 0 | 0 | 0 | ⋯ | 0 | 0 | 0 | 0 |
| Record Count | 0 | 0 | 0 | ⋯ | 0 | 0 | 0 | 0 |
| Absolute Frame Count | 654 | 655 | 656 | ⋯ | 951 | 952 | 953 | 954 |
| Reserved Field | 00 | 00 | 00 | ⋯ | 00 | 00 | 00 | 00 |

1 Frame

FIG.30

| Partition No. | Start Track |
|---|---|
| 1 | 1 |
| 2 | 1000 |
| 3 | 4500 |
| . | . |
| . | . |
| . | . |

FIG.32

| Directory | File Name | Attribute | Start Track | File Size |
|---|---|---|---|---|
| A A A A | A A 0 1 | Attribute/Date, etc | 0 0 0 1 | 4 9 |
| A A A A | A A 0 2 | . | 0 0 5 0 | 4 5 0 |
| A A A A | A A 0 3 | . | 0 5 0 0 | 1 5 0 |
| . | . | . | . | . |
| . | . | . | . | . |
| . | . | . | . | . |
| B B B B | B B 0 1 | . | . | . |
| B B B B | B B 0 2 | . | . | . |
| B B B B | B B 0 3 | . | . | . |
| . | . | . | . | . |
| . | . | . | . | . |
| . | . | . | . | . |
| . | . | . | . | . |
| . | . | . | . | . |
| . | . | . | . | . |

FIG.33

TAPE CASSETTE, TAPE RECORDING APPARATUS AND TAPE REPRODUCING APPARATUS

TECHNICAL FIELD

This invention relates to a tape cassette, a tape recording apparatus and a tape reproducing apparatus which are capable of easily grasping recording information recorded on a tape-shaped recording medium such as a magnetic tape, etc.

BACKGROUND ART

As a recording/reproducing apparatus capable of carrying out recording/reproduction of digital data with respect to a magnetic tape, the so-called tape streamer drive is known. Such a tape streamer drive can have gigantic (huge) recording capacity, e.g., the order of several tens—several hundreds giga bytes although depending upon the tape length of the tape cassette which is a medium used. For this reason, such a tape streamer drive is widely utilized for use in backing up data recorded on media such as hard disc, etc. of the computer body. In addition, such a tape streamer drive is suitable also in the case of storing picture data, etc. of large data size.

As a tape streamer drive as described above, there has been proposed, e.g., a tape streamer drive in which the tape cassette of the 8 mm VTR is used as a recording medium and the helical scan system by the rotary head is employed to carry out recording/reproduction of data.

In the tape streamer drive utilizing the tape cassette of the 8 mm VTR as described above, e.g., SCSI (Small Computer System Interface) is used as the input/output interface for recording/reproduction data.

At the time of recording, data delivered from, e.g., host computer are inputted through the SCSI interface. The input data are caused to be transmitted, e.g., in data group units of a predetermined fixed length, and inputted data are caused to undergo compression processing by a predetermined system as occasion demands and are temporarily stored into the buffer memory. Then, the data stored in the buffer memory are delivered with respect to the recording/reproduction system every units of a predetermined fixed length called group. Thus, recording thereof is carried out with respect to the magnetic tape of the tape cassette by the rotary head.

On the other hand, at the time of reproduction, data of the magnetic tape are read out by the rotary head and are temporarily stored into the buffer memory. Data from the buffer memory are caused to undergo expansion processing if the corresponding data are data which have been subjected to compression at the time of recording, and are then transmitted to the host computer through the SCSI interface.

In addition, partitions are formed in the data recording area on the magnetic tape, and reproduction and/or writing of data can be carried out with respect to these partitions.

Meanwhile, in the data storage system composed of the tape streamer drive and the tape cassette as described above, in order to adequately (reasonably) carry out the recording/ reproduction operation with respect to the magnetic tape of the tape cassette, e.g., various position information on the magnetic tape and/or information related to past record in use, etc. with respect to the magnetic tape are required as management information, etc. that the tape streamer drive utilizes for management of the recording/reproduction operation, etc.

In view of the above, there has been proposed, e.g., an approach to provide the area for such management information at the leading position on the magnetic tape or the leading position of the partition.

At the tape streamer drive side, prior to executing the recording or reproduction operation of data with respect to the magnetic tape, access to the area of the management information is provided to read thereinto necessary management information to execute various processing operations so that the subsequent recording/reproduction operation is adequately (reasonably) carried out on the basis of the management information.

Moreover, after the recording or reproduction operation of data has been completed, in order to rewrite the content of the management information for which change is required followed by the recording/reproduction operation, access to the area of the management information is provided for a second time to carry out rewrite operation of the information content to stand by the subsequent recording/reproduction operation. Thereafter, unloading and eject, etc. of the tape cassette are carried out by the tape streamer drive.

However, in the case where the recording/reproduction operation based on the management information is carried out as described above, the tape steamer drive is subject to situations where, both at the time of recording and at the time of reproduction, there takes place a necessity to provide an access to the area of the management information of the leading portion of the magnetic tape or the leading portion of the partition at the time of start of operation, and to provide an access to the area of the above-mentioned management information also at the time of end (completion) of the operation, thus to carry out write-in/ read-out of information. Namely, loading and unloading cannot be carried out at middle positions on the magnetic tape in which recording/reproduction of data is assumed to be completed.

In the case of the tape streamer drive, it is necessary for access to physically feed the magnetic tape. For this reason, considerable time is required for providing access to the area of the management information of the leading portion of the magnetic tape or the leading portion of the partition when the recording/reproduction operation is completed. Particularly, in such cases that recording/reproduction operation of data is completed at the position physically considerably spaced from the area of the management information on the magnetic tape, the quantity to be fed of the magnetic tape is increased accordingly, and it also takes excessive time.

As stated above in the data storage system using tape cassette as media, relatively large time is required for one recording/reproduction operation be completed, i.e., the access operation carried out from the time when the magnetic tape has been caused to undergo loading until it is caused to undergo unloading last. It is preferable that the time required for such a series of access operations to be as short as possible.

DISCLOSURE OF THE INVENTION

A tape cassette according to this invention includes: a tape-shaped recording medium including at least two partitions, and such that recording data is recorded into respective ones of the partitions, and memory means for storing attached (subsidiary) information relating to the respective ones of the partitions in a manner independent of the tape-shaped recording medium.

The tape cassette according to this invention is characterized in that, e.g., the partition includes data area where at least the recording data can be recorded, and data end area indicating end of the data area and device area where the tape-shaped recording medium is caused to undergo loading/ unloading by a recording/reproduction unit, which are succeeding (subsequent) to the data area.

Moreover, the tape cassette according to this invention is characterized in that e.g., the attached (subsidiary) information consists of partition No. for discriminating between the partitions and start track No. indicating start track of the partition corresponding to the partition No.

Further, the tape cassette according to this invention is characterized in that, e.g., the attached (subsidiary) information is information relating to past record in use of the partition.

Further, the tape cassette according to this invention is characterized in that, e.g., the partition includes at least one directory, and such that at least one of the recording data recorded as file is included within the directory, and the attached (subsidiary) information consists of the directory and file directory information relating to the file.

Further, the tape cassette according to this invention is characterized in that, e.g., the data area, the data end area and the device area respectively include area ID corresponding to the respective areas.

Further, the tape cassette according to this invention is such that, e.g., the attached (subsidiary) information is unload information indicating the device area of the partition unloaded last.

Further, the tape cassette according to this invention is characterized in that, e.g., the file directory information is attribute information indicating attribute and/or preparation date of the file, start track information indicating recording start track of the file, or file size information indicating size of the file.

A tape recording apparatus according to this invention is directed to a tape recording apparatus adapted for recording recording data onto a tape-shaped recording medium of a tape cassette including the tape-shaped recording medium in which the area thereon is divided into at least two partitions and recording data is recorded into the respective partitions, and memory means for storing attached (subsidiary) information relating to respective ones of the partitions in a manner independent of the tape-shaped recording medium, characterized in that the apparatus comprises: input means for inputting recording data recorded onto the tape-shaped recording medium; read-out means for reading out the attached information from the memory means; recording control means for recording the recording data inputted by the input means onto the tape-shaped recording medium on the basis of the attached information obtained by the read-out means; attached information generating means for generating one of the attached information newly appearing in recording the recording data onto the tape-shaped recording medium; and writing means for writing, into the memory means, the new attached information that the attached information generating means has generated.

In addition, the tape recording apparatus according to this invention is characterized in that, e.g., the writing means writes the attached information into the memory means after recording of the recording data onto the tape-shaped recording medium by the recording control means has been completed.

A tape reproducing apparatus according to this invention is directed to a tape reproducing apparatus adapted for reproducing recording data from a tape-shaped recording medium of a tape cassette including the tape-shaped recording medium in which the area thereon is divided into at least two partitions and recording data is recorded into the respective partitions, and memory means for storing attached (subsidiary) information relating to respective ones of the partitions in a manner independent of the tape-shaped recording medium, characterized in that the apparatus comprises: read-out means for reading out the attached information from the memory means; reproduction control means for reproducing the recording data from the tape-shaped recording medium on the basis of the attached information that the read-out means has read; attached information generating means for generating one of the attached information newly appearing in reproducing the recording data from the tape-shaped recording medium; writing means for writing, into the memory means, the new attached information that the attached information generating means has generated; and output means for outputting reproduction data obtained by the reproduction control means.

BRIEF DESCRIPTION OF THE DRAWINGS

FIG. 28 is an explanatory view showing ID area information of the magnetic tape.

FIG. 29 is an explanatory view showing definition of area ID of the magnetic tape.

FIG. 30 is an explanatory view illustrating ID area in EOD area of the magnetic tape.

FIG. 32 is a view for explaining management information of respective partitions formed on the magnetic tape.

FIG. 33 is a view for explaining management information for carrying out management of respective files recorded within respective directories of the respective partitions.

BEST MODE FOR CARRYING OUT THE INVENTION

Figure 1:
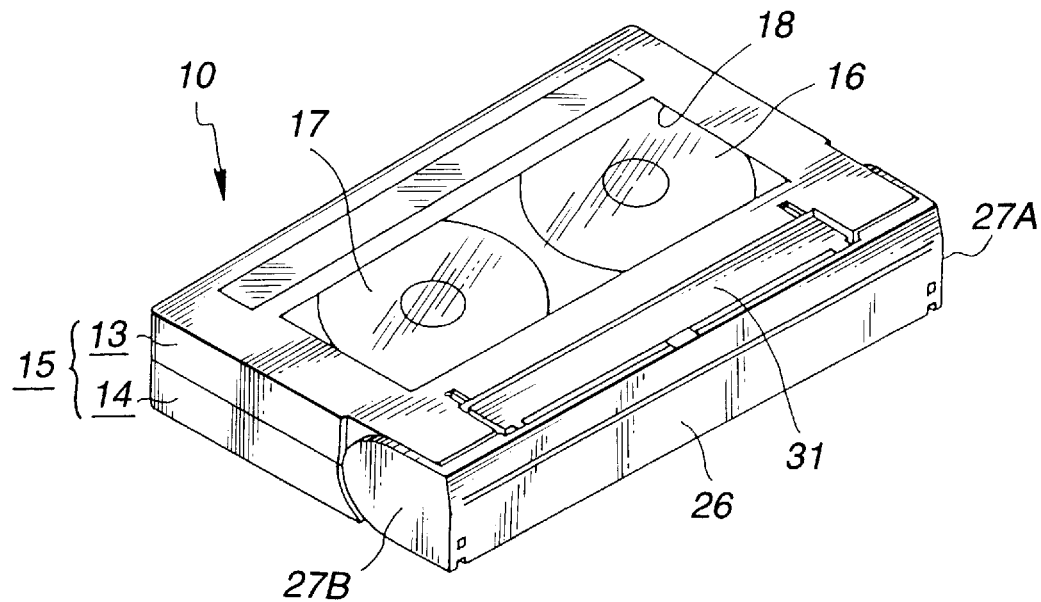
FIG. 1 is a perspective view of a tape cassette according to this invention.

Best mode for carrying out this invention will now be described in detail with reference to the attached drawings.

Various inventions with respect to the tape cassette provided with non-volatile memory, and the tape streamer drive in which recording/reproduction of data can be carried out in correspondence with the tape cassette with the memory have been already proposed by the applicant of this invention, and the data storage system composed of the tape cassette with memory and the tape streamer drive as described above is applied to this invention. It is to be noted the non-volatile memory provided in the tape cassette is hereinafter referred to as MIC (Memory In Cassette).

Explanation of the embodiment below will be given in order recited below.

1. Configuration of the tape cassette
2. Configuration of the recording/reproduction unit
3. Operation of the recording/reproduction unit
4. Structure of data recorded on the magnetic tape
5. ID area
6. Data structure of MIC
    (a) Data structure of the entirety of MIC
    (b) System log area
7. Access examples of the recording/reproduction unit
    (a) Access example in the case where MIC is not provided
    (b) Access example (1) in the case where MIC is provided
    (c) Access example (2) in the case where MIC is provided
    (d) Access example (3) in the case where MIC is provided 1. Configuration of the tape cassette Initially, the tape cassette corresponding to the tape streamer drive of this embodiment will be described below.

The tape cassette 10 is adapted, as shown in FIG. 1, in more practical sense, so that a pair of an upper half 13 and a lower half 14 in upper and lower directions formed by synthetic resin material so as to take substantially rectangular shallow dish shape are combined in such a manner that their opening sides are pressed to each other thereafter to join them by means of plural set screws to constitute a substantially box-shaped cartridge body 15. Within the cartridge body 15, a tape supply reel 16 and a tape winding reel 17 adapted so that they are juxtaposed in a length direction and a magnetic tape 12 is laid thereacross and rotatably accommodated.

Figure 2:
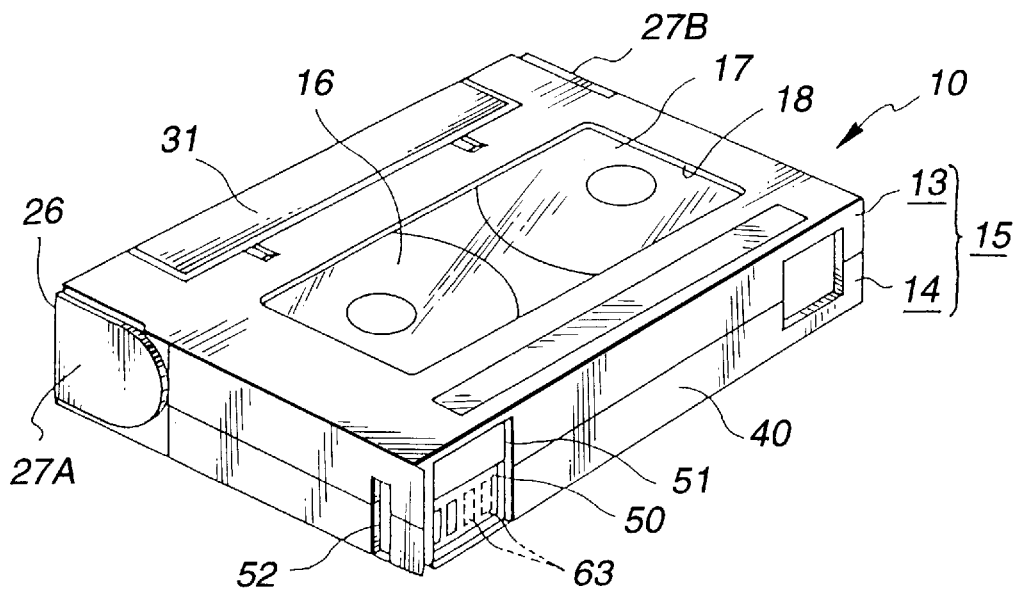
FIG. 2 is a perspective view from the back side of the tape cassette.
Figure 3:
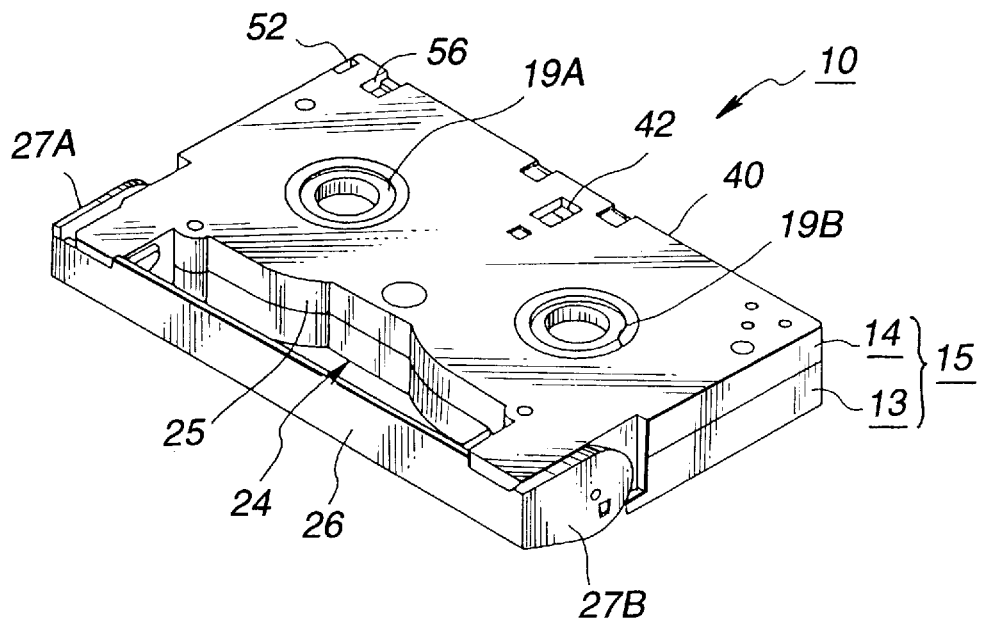
FIG. 3 is a perspective view from the bottom surface side of the tape cassette.

At the cartridge body 15, as shown in FIG. 2, a rectangular indication window 18 is provided at the ceiling surface of the upper half 13 constituting the upper surface portion so that the state of the magnetic tape 12 wound on the tape supply reel 16 and the tape winding reel 17 accommodated within the cartridge body 15 can be visually observed from the outside. Moreover, at the cartridge body 15, as shown in FIG. 3, there are provided, at the lower half 14 constituting the bottom surface portion, hub fitting holes 19A, 19B for facing respective portions of hubs of the tape supply reel 16 and the tape winding reel 17 to the external and for limiting rotation of the tape supply reel 16 and the tape winding reel 17. In this example, at the bottom surface portion of the lower half 14, there are provided various discrimination holes such as a tape length detection hole for detecting length of the magnetic tape 12 and a tape specification discrimination hole for discriminating kind (type) of the magnetic tape 12, etc.

The tape supply reel 16 and the tape winding reel 17 are each composed of a cylindrical hub portion on which the magnetic tape 12 is wound, and a disc-shaped flange portion provided at one side of the hub portion. The tape supply reel 16 and the tape winding reel 17 are rotatably accommodated within the cartridge body 15 in the state where the hub portions are respectively fitted into the hub fitting holes 19A, 19B. Moreover, the tape supply reel 16 and the tape winding reel 17 are adapted so that shaking within the cartridge body 15 is prevented because the rotation center portions of the hub portions are biased toward the lower half 14 side by reel holding spring and reel holding plate which are not shown.

The magnetic tape 12 is adapted so that both ends thereof are respectively fixed by damper (not shown) at the hub portions of the tape supply reel 16 and the tape winding reel 17, and that it travels along a front portion 23 of the cartridge body 15 while being guided by tape guides 22A, 22B formed integrally with the lower half 14 after it is drawn out from the tape supply reel 16, and is wound onto the tape winding reel 17.

At the cartridge body 15, there is provided a substantially convex tape drawing portion 24 adapted so that the front portion 23 of the cartridge body 15 is opened extending over substantially the entirety in a width direction, and loading means of a recording/reproduction unit 130 side is continuously admitted thereinto from the front portion 23. The cartridge body 15 is adapted so that the internal space within which the tape supply reel 16 and the tape winding reel 17 are rotatably accommodated and a tape drawing portion 24 is partitioned by a partition wall 25 therebetween.

At the cartridge body 15, a cover member 26 for closing the opened front portion 23 is rotatably assembled. The cover member 26 has length substantially equal to the width of the cartridge body 15, and is such that side wall portions 27A, 27B constituting fulcrum portions are integrally formed at the both end sides in a manner opposite to each other, whereby the entirety is formed substantially channel shaped. At the inner surfaces of the side wall portions 27A, 27B, pin shafts are integrally formed in the state where the axes are caused to be in correspondence with each other.

Figure 4:
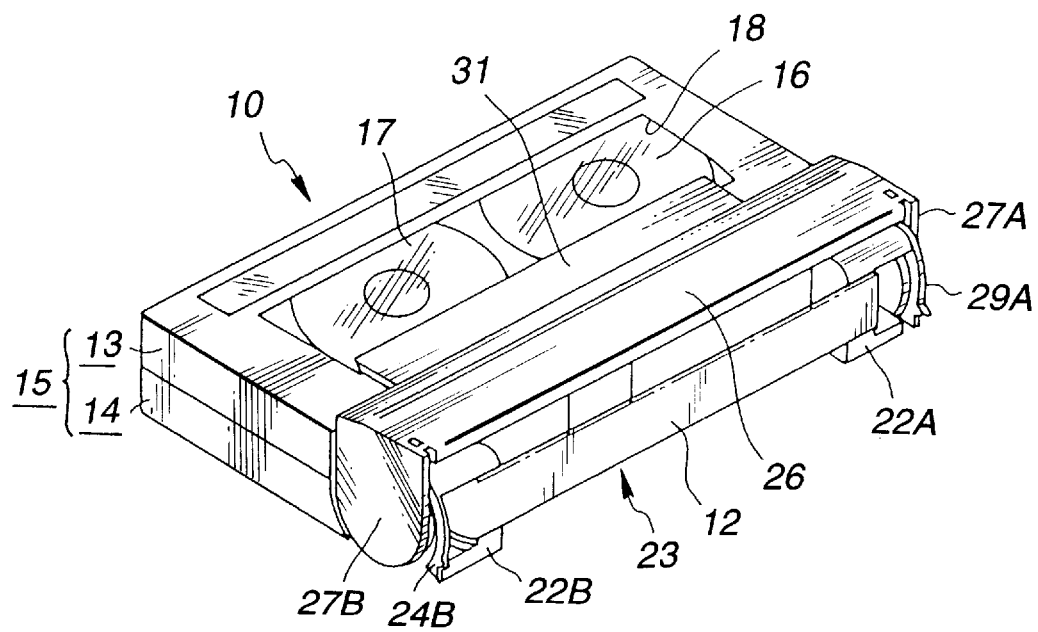
FIG. 4 is a perspective view showing the state where cover member rotatably assembled at the front portion is rotationally operated in the tape cassette.

On the other hand, at the cartridge body 15 side, both side walls of the lower half 14 side are projected and extended in such a manner to surround the opened front portion 23, whereby fulcrum portions 29A, 29B are constituted. At these fulcrum portions 29A, 29B, axial holes are respectively provided so that their axes are caused to be in correspondence with each other in a manner to correspond to the pin shaft of the cover member 26. Accordingly, the cover member 26 is rotatably combined with the front portion 23 of the cartridge body 15 by engaging the pin shaft with the axial holes. As shown in FIG. 4, the cover member 26 ordinarily close the opened front portion 23 of the cartridge body 15.

An upper cover portion 31 for closing the front opening portion of the upper half 13 and spring member (although not shown) are assembled with the cover member 26. The upper cover member 31 is rotatably assembled at the internal surface of the cover member 26. As shown in FIG. 3, in the state where the cover member 26 is rotationally operated so that the front portion 23 of the cartridge body 15 is opened, the upper cover portion 31 is caused to undergo movement operation along the upper portion of the upper half 13 while being subjected to rotational operation in the state supported by the cover member 26. In this case, although the detail is omitted, the spring member is biased so as to store elastic force to render the rotational peculiarity in a direction to close the front portion 23 of the cartridge body 15 with respect to the cover member 26.

Moreover, although the detail is omitted, inner cover member is rotatably assembled with respect to the cover member 26 in a manner to oppose the inside principal surface. This inner cover member is ordinarily oppositely supported with a predetermined spacing (gap) with respect to the inside principal surface of the cover member 26. The magnetic tape 12 positioned at the front portion 23 of the cartridge body 15 travels within this gap. Accordingly, the magnetic tape 12 is ordinarily covered by the cover member 26 and the inner cover member, and is thus protected from attachment of dust, etc. or external force. The inner cover member is caused to undergo rotational operation in a manner interlocking with the above-described rotational operation of the cover member 26 to allow the magnetic tape 12 to be exposed to the front portion 23 of the cartridge body 15.

The tape cassette 10 is provided with reel lock mechanism for preventing the tape supply reel 16 and the tape winding reel 17 to be loosely moved in the ordinary state thereby preventing the magnetic tape 12 wound thereon to be loosened.

Figure 5:
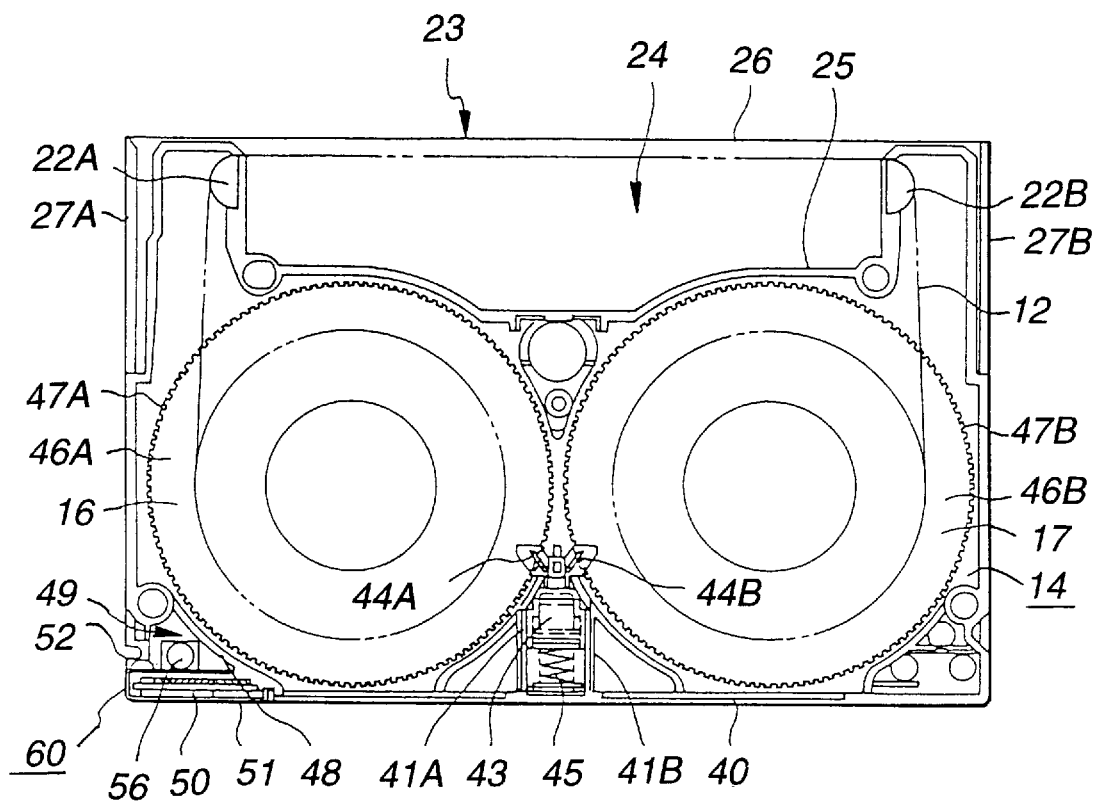
FIG. 5 is a plan view showing the internal mechanism in the state where upper half is detached in the tape cassette.

This reel lock mechanism is disposed at the central portion of the back side of the lower half 14 as shown in FIG. 5, and is composed of a lock lever 44A elastically in contact with engagement teeth 47a formed at the outer circumferential portion of a flange portion 46A of the tape supply reel 16 and a lock lever 44B elastically in contact with engagement teeth 47B formed at the outer circumferential portion of a flange portion 46B of the tape winding reel 17, a slider 43 adapted so that these lock levers 44 are rotatably assembled at the front end portion, and a coil spring 45 for biasing the slider 43 to the side of the tape supply reel 16 and the tape winding reel 17.

The slider 43 is movably assembled within a slide space portion constituted by guide walls 41A, 41B in parallel to each other vertically provided at the bottom surface portion of the lower half 14 in the state positioned between the tape supply reel 16 and the tape winding reel 17, and is adapted so that working (operation) portion (not shown) faced toward the external in a manner penetrated through a guide hole 42 provided at the bottom surface portion of the lower half 14 is integrally formed.

When the tape cassette 10 is loaded into recording/reproduction unit 130 of the tape streamer drive which will be described later, the working member of the recording/reproduction unit 130 is fitted into the guide hole 42 to allow the slider 43 to undergo movement operation toward the back side against the elastic force of the coil spring 45. As a result, the lock levers 44A, 44B are withdrawn from the state of engagement with the engagement teeth 47 of the tape supply reel 16 and the tape winding reel 17. Thus, the lock state of the tape supply reel 16 and the tape winding reel 17 is released.

Figure 7:
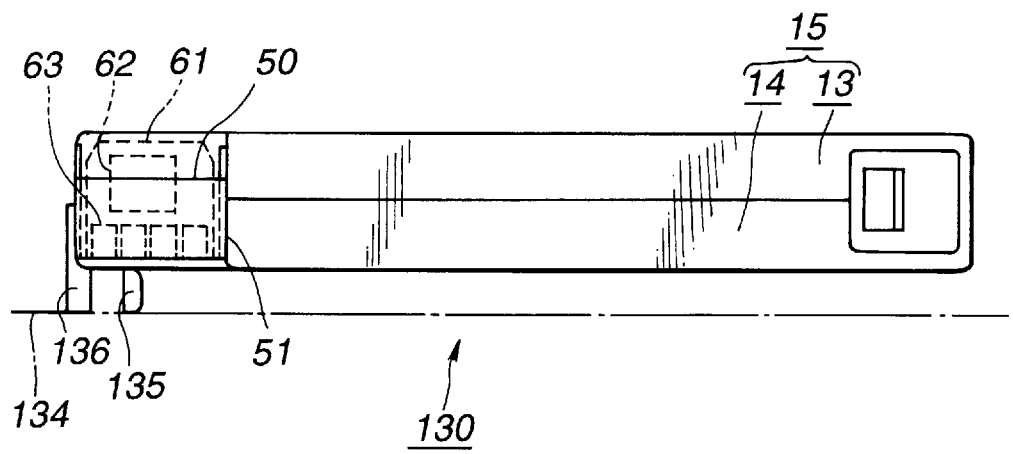
FIG. 7 is a back view for explaining an operation to load the tape cassette into the tape streamer drive.

Moreover, an auxiliary memory unit 60 is mounted in the tape cassette 10. This auxiliary memory unit 60 is composed, as shown in FIG. 7, for example, of at least a wiring board 61, a non-volatile memory MIC (Memory In Cassette) 62 mounted on the wiring board 61, and a plurality of contact terminals 63 formed on the wiring board 61 serving as input/output terminals of the MIC 62.

Namely, the MIC 62 is composed of memory element and input/output control unit for controlling input/output of data between a write-in/read-out control unit 163 of the tape streamer drive connected to the contact terminal 63 and the MIC 62 through the contact terminals 63 and connector 137 which will be described later at the time of recording and the MIC 62.

In the case where, e.g., the number of contacts of the contact terminals 63 is caused to be less than sum of the numbers of data lines/address lines of the memory element and the number of wirings for supply of power, input/output of data between the MIC 62 and the write-in/read-out control unit 163 is carried out by serial communication. In this case, communication control units are respectively provided in the input/output control unit and the write-in/read-out control unit 163.

In the case where input/output of data between the MIC 62 and the write-in/read-out control unit 163 is carried out by the serial communication as stated above, the number of contact terminals 63 can be reduced. Thus, the area of the contact terminals 63 can be reduced. For this reason, terminal opening portion 51 which will be described later formed at the tape cassette 10 can be reduced. Accordingly, design of other constituent members of the tape cassette 10 can be facilitated.

Moreover, in the case where, e.g., the number of contacts of the contact terminals 63 is caused to be equal to or more than sum of the numbers of data lines/address lines of the memory element and the number of wirings for supply of power, the write-in/read-out control unit 163 can directly control write-in/read-out operation with respect to the memory element of the MIC 62. In this case, the input/output control unit can be caused to be of simple structure, and write-in/read-out operation with respect to the memory element can be carried out at a high speed.

In addition, discrimination information for discriminating, e.g., the content of data, the magnetic tape specification or use state, etc. recorded on the magnetic tape 12 is recorded in the auxiliary memory unit 60.

The above-mentioned wiring board 61 is constituted as the so-called double-sided board so that, in the state assembled into the cartridge body 15 as described later, the MIC 62 is mounted on one principal surface side positioned inside and contact terminals 63 are formed by printing on the other principal side positioned outside.

The auxiliary memory unit 60 is disposed, as shown in the FIG. 2 mentioned above, in such a manner that the contact terminals 63 are faced toward the external through a terminal opening portion 51 provided at a rising circumferential wall 40 in the state positioned at one corner portion of the back side of the cartridge body 15.

Moreover, substantially triangular corner space portions constituted by a tape reel guide wall 48 formed in a rising manner from the bottom surface portions of the upper half 13 and the lower half 14 and adapted for holding the outer circumferential portions of the flange portions 46A, 46B of the tape supply reel 16 and the tape winding reel 17, and rising circumferential wall 40 constituting the outer circumferential wall of the cartridge body 15 are provided at the both corner portions of the back side as shown in the FIG. 5 mentioned above.

At one corner space portion 49, there is provided an insertion groove in a height direction for fixing the auxiliary memory unit, which is formed on the inside surface where the tape reel guide wall 48 and the rising circumferential wall of the side wall are opposite to each other. In this example, at the other corner space portion, there are provided various discrimination holes such as the tape length detection hole for detecting length of the magnetic tape 12, and tape specification discrimination hole for discriminating kind (type) of the magnetic tape 12 which have been described above, etc.

The terminal opening portion 51 is formed as a rectangular opening portion having opening dimensions sufficient to face the contact terminals 63 of the auxiliary memory unit 60 toward the external at the rising circumferential wall 40 constituting the corner space portions 49. The auxiliary memory unit 60 is assembled with respect to the cartridge body 15 in the state where both side edges of the wiring board 61 are fitted into the insertion groove in a manner to allow the MIC 62 to be positioned inside and to face the contact terminals 63 from the terminal opening portion 51 toward the external. Between the contact terminals 63 and the terminal opening portion 51, a shutter member 50 is disposed.

Figure 6:
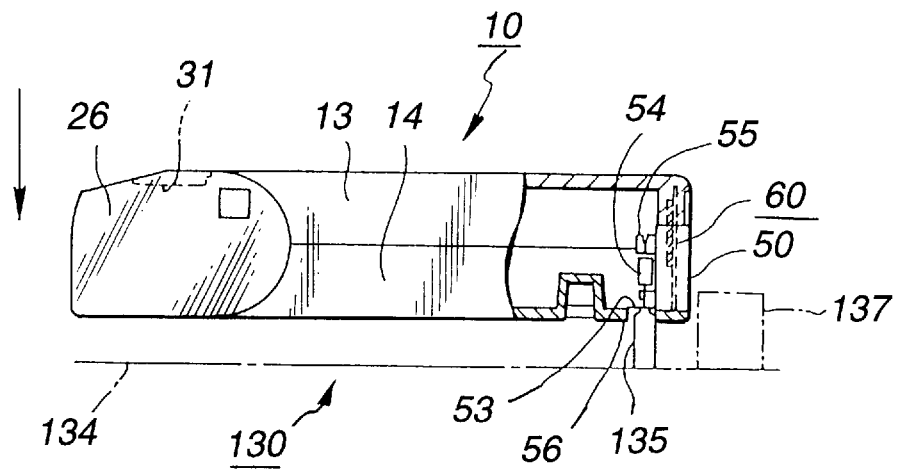
FIG. 6 is a partially cut side cross sectional view for explaining an operation to load the tape cassette into tape streamer drive.

The shutter member 50 is constituted as a rectangular member having an outer shape sufficient to close the terminal opening portion 51, wherein the working portion 53 bent toward the front side along the bottom surface portion of the lower half 14 is integrally provided at the lower end portion as shown in FIG. 6. Moreover, a spring hook (holding) piece 55 is integrally formed at the back portion of the upper end side of the shutter member 50. At the spring hook piece 55, an extension spring 54 is stretched between the spring hook piece 55 and the bottom surface portion of the lower half 14. The shutter member 50 is biased toward the bottom surface portion side of the lower half 14 by elastic force of the extension spring 54, and ordinarily close the terminal opening portion 51.

On the other hand, at the bottom surface portion of the lower half 14 constituting the cartridge body 15, a guide hole 56 is provided in the state positioned oppositely to the working portion 53 of the shutter member 50. This guide hole 56 is such that the bottom surface side of the lower half 14 is constituted as a rectangular recessed portion opened to the back portion, and the bottom portion of the rectangular recessed portion corresponding to the working portion 53 is constituted as a penetration hole.

At the side surface portions corresponding to the corner space portion 49 of the cartridge body 15, there is provided a positioning groove 52 in height direction bridging over the lower half 14 and the upper half 13 and opened to the bottom surface portion of the lower half 14 (see FIG. 5). In this case, although detailed illustration is omitted, the positioning groove 52 is of a structure such that the opening portion of the lower half 14 side is caused to be slightly large so that fitting operation with respect to a positioning member 136 of the recording/reproduction unit 130 side can be smoothly carried out.

When the tape cassette 10 constituted as described above is inserted from the insertion hole of the recording/reproduction unit 130, it is moved in a lower direction as indicated by arrow in the FIG. 6 mentioned above, and is then loaded into the loading portion of the recording/reproduction unit 130. In this case, the tape cassette 10 is caused to undergo an operation as shown in FIG. 7 such that the positioning member 136 of the recording/reproduction unit 130 side is relatively engaged with the positioning groove 42 provided at the side surface portion of the lower half 14, whereby the tape cassette 10 is loaded into the loading portion of the recording/reproduction unit 130 in the state where it has been caused to undergo positioning.

When the tape cassette 10 is loaded into the recording/reproduction unit 130, the cover member 26 is caused to undergo rotational operation in a direction to open the front portion 23 of the cartridge body 15 by cover opening means (not shown) of the recording/reproduction 130 side, and the reel drive shafts of the recording/reproduction unit 130 side is fitted into the hub fitting holes 19A, 19B. Further, the tape cassette 10 is caused to undergo an operation such that the above-described reel lock mechanism is caused to be operative so that lock state of the tape supply reel 16 and the tape winding reel 17 is released.

Accordingly, the tape cassette 10 is caused to undergo an operation as shown in the FIG. 4 mentioned above such that the front portion 23 of the cartridge body 15 is greatly opened, resulting in the state where the magnetic tape 12 is exposed to the front portion 23. Then, the loading mechanism of the recording/reproduction unit 130 side is admitted into the tape drawing portion 24 to draw the magnetic tape 12 from the cartridge body 15 to obliquely wind it onto the rotary drum 31. Thus, there results the state where recording/reproduction by the recording/reproduction unit 130 can be carried out.

Figure 8:
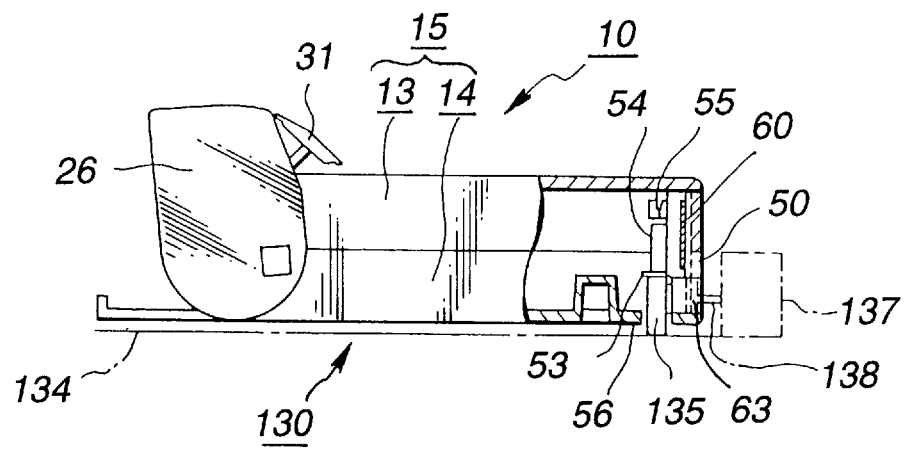
FIG. 8 is a partially cut side view for explaining an operation in which the tape cassette is loaded into loading portion of the tape streamer drive so that connection terminals are connected to connector unit.
Figure 9:
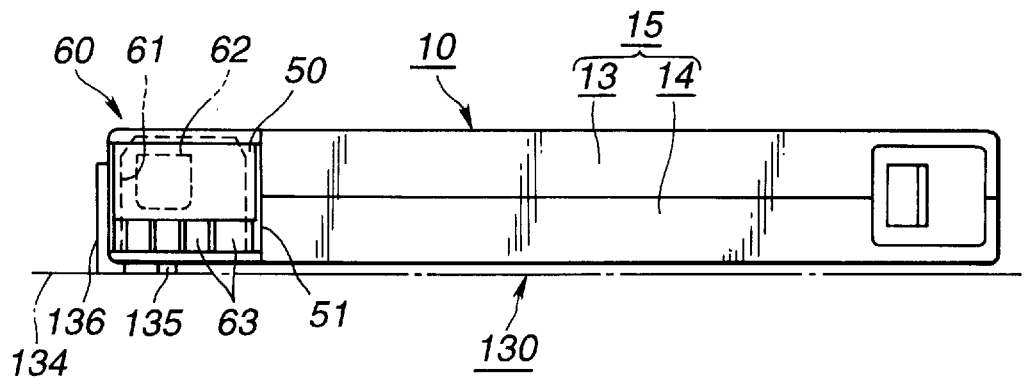
FIG. 9 is a back view for explaining an operation in which the tape cassette is loaded into the loading portion of the tape streamer drive so that the connection terminals are connected to the connector unit.

Moreover, in the case where when the tape cassette 10 is moved in a lower direction down to the loading portion of the recording/reproduction unit 130, a shutter drive member 135 of the recording/reproduction unit 130 side is admitted into the guide hole 56 so that it collides against the working portion 53 of the shutter member 50, the shutter member 50 is pushed toward the upper direction along with the working portion 53. By the pressing operation of the shutter drive member 135, the shutter member 50 is caused to undergo movement operation toward the upper direction along the rising circumferential wall 40 of the cartridge body 15 against elastic force of the extension spring 54. Thus, the shutter member 50 is positioned at the upper side of the terminal opening portion 51 as shown in FIGS. 8 and 9 to allow the contact terminals 63 to be placed from the state where it closes the contact terminals 63 to the state where it allows these contact terminals 63 to be exposed to the terminal opening portion 51.

On the other hand, at the recording/reproduction unit 130 side, connector 137 of the auxiliary recording/reproduction unit side is disposed in correspondence with the terminal opening portion 51 of the loaded tape cassette 10. The connector 137 can be connected to the auxiliary recording/reproduction unit for reproducing discrimination information stored in the MIC 62 and for allowing the MIC 62 to store thereinto updated discrimination information. The connector 137 is adapted so that in the state where the tape cassette 10 is loaded into the loading portion of the recording/reproduction unit 130, as shown in the FIG. 8 mentioned above, spring terminals 138 are admitted from the terminal opening portion 51 to come into contact with the contact terminals 63 of the auxiliary memory unit 60.

In this case, as described above, the tape cassette 10 is loaded into the loading portion of the recording/reproduction unit 130 in the state where it has been caused to undergo positioning as the result of the fact that the positioning groove 52 and the positioning member 36 are relatively engaged with each other, whereby the corresponding spring terminals 138 of the connector 137 and the contact terminals 63 respectively come into contact with each other with good accuracy. Accordingly, the tape cassette 10 is adapted so that even if the spacing between terminals of the contact terminals 63 is very small, erroneous connection to the spring terminals 138 of the connector 137 is prevented. Thus, reliability of write-in and read-out operations with respect to the MIC 62 from the write-in/read-out control unit 163 can be improved.

Figure 10:
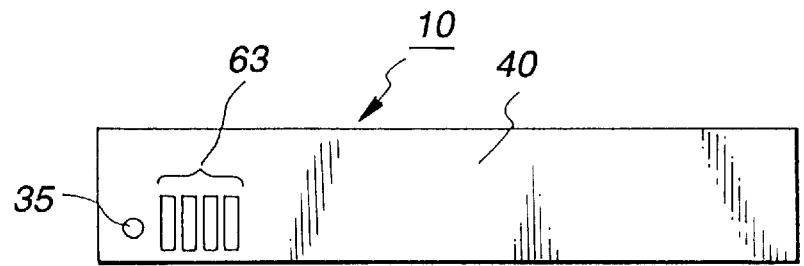
FIG. 10 is a back view showing an example of positioning member provided at the tape cassette.

In this case, as shown in FIG. 10, for example, there may be employed a configuration in which a positioning penetration hole 35 is provided, in a manner adjacent to the contact terminals 63, at the rising circumferential wall 40 of the back side of the tape cassette 10, whereby when the tape cassette 10 is loaded into the recording/reproduction unit 130, the tape cassette 10 is loaded in the state where it has been caused to undergo positioning as the result of the fact that positioning member (not shown) of the recording/reproduction unit 130 side is relatively engaged with the penetration hole 35 for positioning.

Figure 11:
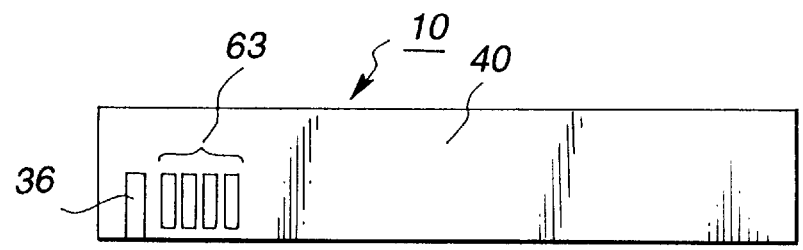
FIG. 11 is a back view showing another example of the positioning member provided at the tape cassette.

Further, there may be employed a configuration, as shown in FIG. 11, for example, in which a positioning groove 36 in height direction opened to the bottom surface portion is provided in a manner adjacent to the contact terminals 63 at the rising circumferential wall 40 of the back side of the tape cassette 10, whereby when the tape cassette 10 is loaded into the recording/reproduction unit 130, the tape cassette 10 is loaded in the state where it has been caused to undergo positioning as the result of the fact that positioning member (not shown) of the recording/reproduction 130 side is relatively engaged with the positioning hole 36 for positioning.

Figure 12:
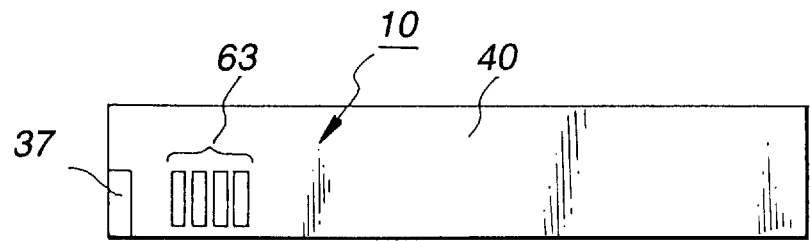
FIG. 12 is a back view showing a further example of the positioning member provided at the tape cassette.
Figure 13:
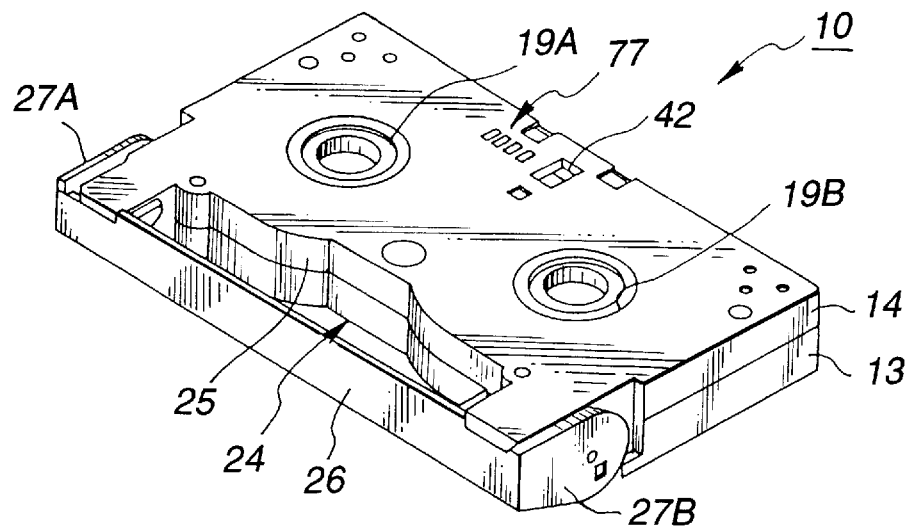
FIG. 13 is a perspective view from the bottom surface side of the tape cassette according to this invention.

In addition, there may be employed a configuration, as shown in FIG. 12, for example, in which a positioning projected portion 37 in height direction is provided in a manner adjacent to the contact terminals 63 at the rising circumferential wall 40 of the back side of the tape cassette 10, whereby when the tape cassette 10 is loaded into the recording/reproduction unit 130, the tape cassette 10 is loaded in the state where it has been caused to undergo positioning as the result of the fact that the projected portion 37 is relatively engaged with positioning groove (not shown) provided at the recording/reproduction unit 130 side.

As described above, the penetration hole 35, the positioning groove 36 or the positioning projected portion 37 relatively engaged with the positioning member or the positioning groove is provided, thereby permitting the corresponding spring terminals 138 of the connector 137 and the contact terminals 63 to be in contact with each other with good accuracy.

Moreover, while the terminal opening portion 51 for allowing the contact terminals 63 to be exposed is provided at one corner portion of the rising circumferential wall 40 of the back side of the cartridge body 15 in the tape cassette 10 shown in the FIGS. 1 to 9 mentioned above, terminal opening portions 77 may be provided at the back side of the bottom surface of the lower half. In the following description, the same reference numerals are respectively attached to components similar to those of the tape cassette 10 shown in the FIGS. 1 to 9 mentioned above, and their explanation is omitted.

Figure 14:
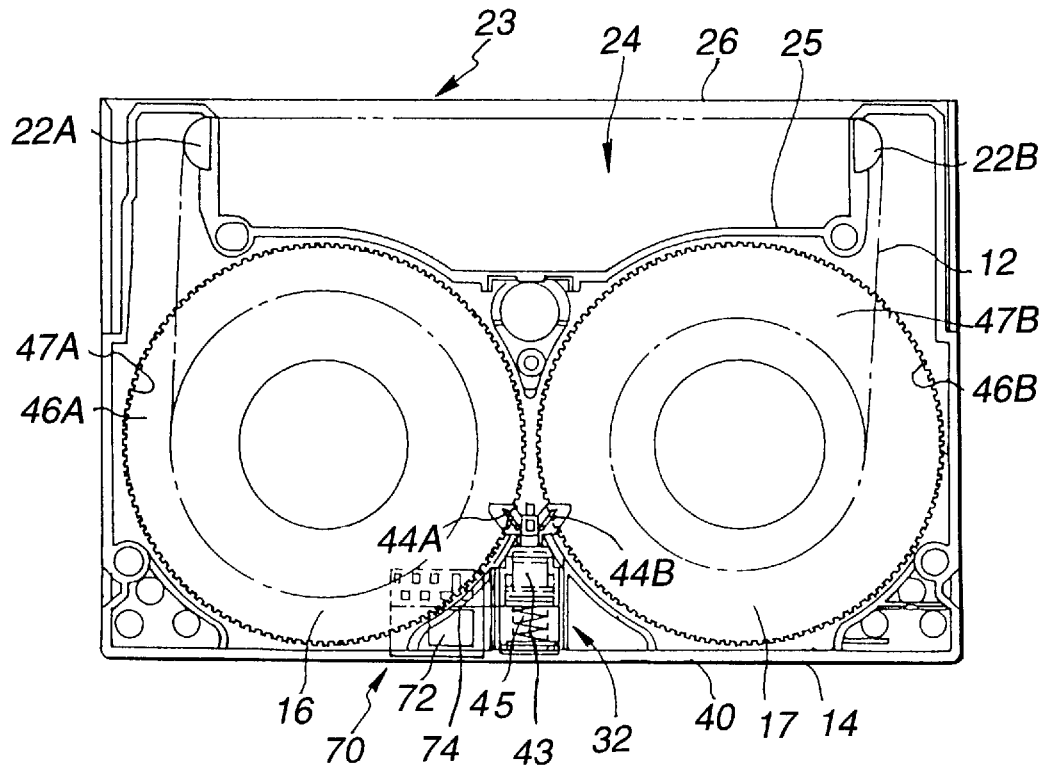
FIG. 14 is a plan view showing the configuration of the internal mechanism in the state where upper half is detached of the tape cassette.
Figure 15:
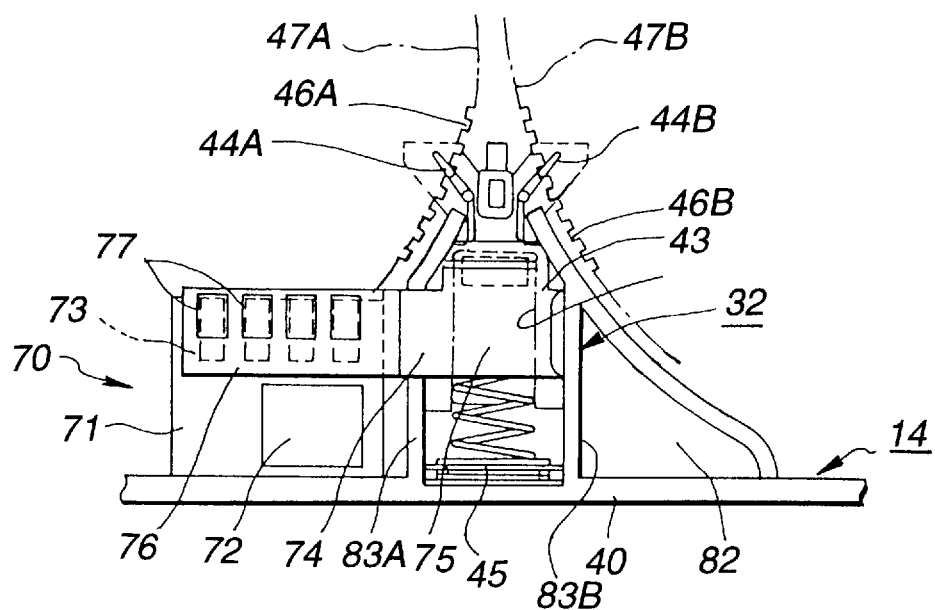
FIG. 15 is a plan view of the essential part showing the ordinary state where tape reel is caused to be in lock state by tape reel lock mechanism and shutter member is in closed state in the tape cassette.

Further, this tape cassette 10 is provided, as shown in FIG. 14, with an auxiliary memory unit 70 corresponding to the auxiliary memory unit 60 provided in the tape cassette 10 shown in the FIGS. 1 to 9 mentioned above. This auxiliary memory unit 70 is composed, as shown in FIG. 15, of at least a wiring board 71, a non-volatile memory (MIC) 72 mounted on the wiring board 71, and plural contact terminals 73 formed on the wiring board 71 serving as input/output terminals of the MIC 72. The wiring board 71 is constituted as the so-called double-sided substrate similarly to the above-described wiring board 61, wherein, as described later, in the state where it is assembled with respect to the cartridge body 15, the MIC 72 is mounted on one principal surface side positioned inside and the contact terminals 73 are formed by printing on the other principal side positioned outside.

Figure 16:
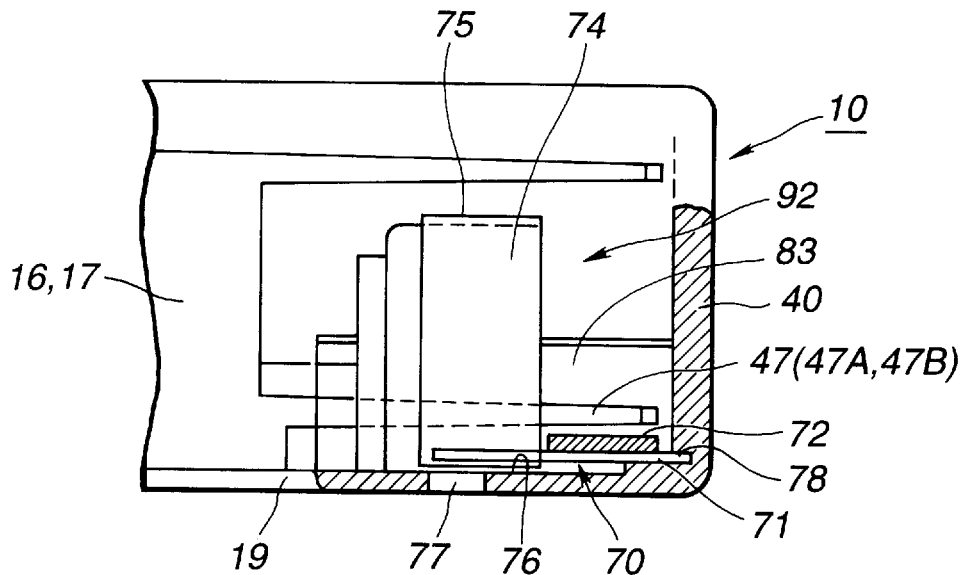
FIG. 16 is a longitudinal cross sectional view of the essential part showing the ordinary state where the tape reel is caused to be in lock state by the tape reel lock mechanism and the shutter member is in closed state in the tape cassette.

The auxiliary memory unit 70 is disposed in such a manner that the contact terminals 73 are faced toward the external through plural terminal opening portions 77 provided at the bottom surface portion 82 along the bottom surface portion 82 of the lower half 14 constituting the cartridge body 15 in the state adjacent to the above-described tape reel lock mechanism 32. In this case, as shown in FIG. 16, the auxiliary memory unit 70 is assembled with respect to the lower half 14 as the result of the fact that one end portion of the wiring board 71 is inserted into an insertion groove 78 formed at the rising circumferential wall 40 of the lower half 14. In this example, the terminal opening portions 77 are respectively comprised of plural rectangular through-holes in alignment in the length direction at the bottom surface portion 82 of the lower half 14 with opening dimensions sufficient to allow the contact terminals 73 to be faced toward the external. These terminal opening portions 77 are ordinarily in closed state by a shutter portion 76 of a shutter member 74 as described later.

Figure 17:
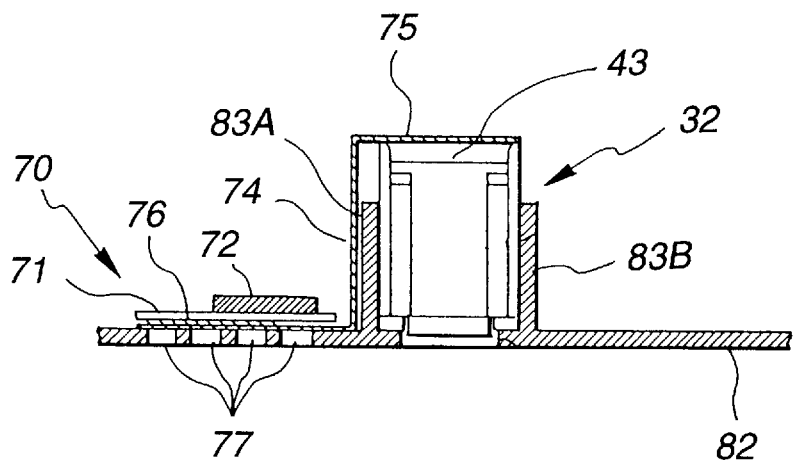
FIG. 17 is a longitudinal cross sectional view of the essential part for explaining the configuration of the tape reel lock mechanism of the tape cassette and auxiliary memory unit.

The shutter member 74 is a member formed by bending plate member thin in thickness so as to take substantially crank shape in cross section as shown in FIG. 17, wherein an upper side horizontal portion 75 serving as one end side is joined and fixed to the upper surface portion of the slider 43 of the tape reel lock mechanism 32, the rising portion is extended until the bottom surface portion 82 of the lower half 14 along the outside of one slider guide wall 83A, and the lower side horizontal portion serving as the other end side is constituted as the shutter portion 76. The shutter portion 76 is extended between the wiring board 71 of the MIC 72 disposed along the bottom surface portion 82 of the lower half 14 and the bottom surface portion 82. In addition, the shutter portion 76 has outer dimensions sufficient to close the terminal opening portions 77.

Figure 18:
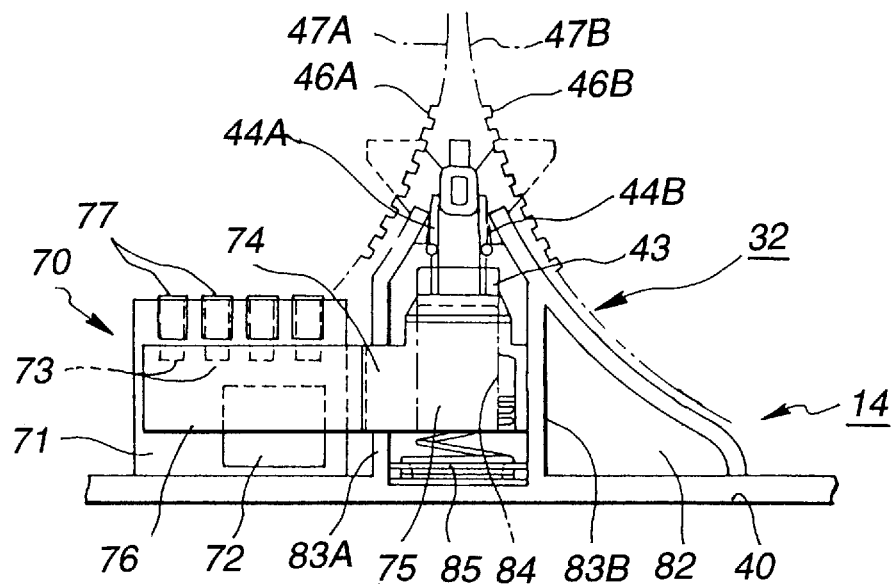
FIG. 18 is a plan view of the essential part showing the state where lock state of the tape reel by the tape reel lock mechanism is released and the shutter member is opened as the result of the fact that the tape cassette is loaded into recording/reproduction unit.

When the tape cassette 10 is loaded into the recording/reproduction unit 130 as described above, the slider 43 is caused to undergo movement operation by the working member of the recording/reproduction unit 130 side, so lock state of the tape supply reel 16 and the tape winding reel 17 by the lock levers 44A, 44B is released. The shutter member 74 is caused to undergo movement operation toward the back side of the cartridge body 15, as shown in FIG. 18, by the movement operation of the slider 43. By the movement operation of the entirety of the shutter member 74, the shutter portion 76 allows the contact terminals 73 to be brought into the state where the contact terminals 73 are exposed to the terminal opening portion 77 from the state where the shutter portion 76 closes the contact terminals 73.

Figure 19:
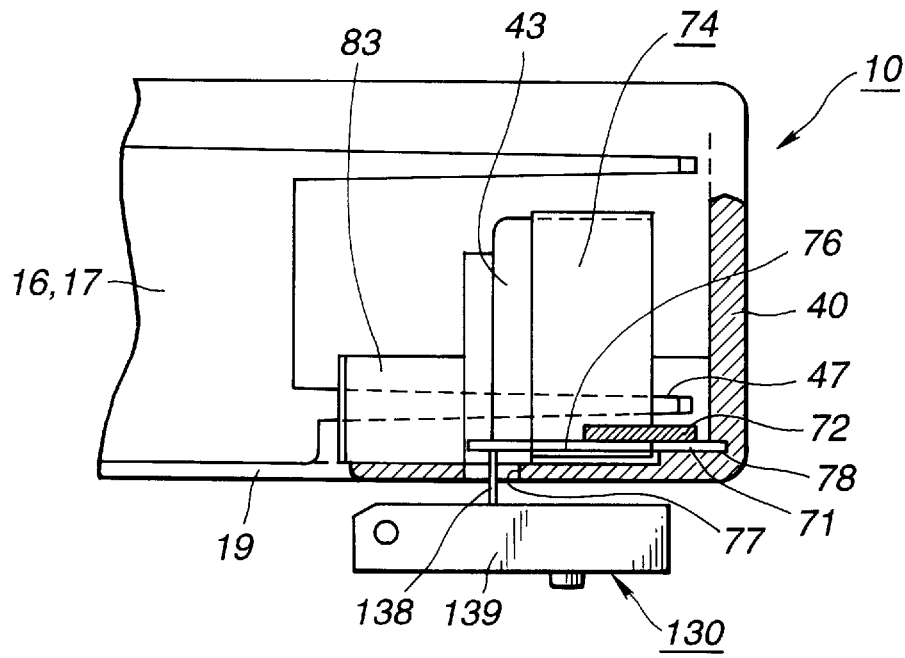
FIG. 19 is a longitudinal cross sectional view of the essential part showing the state where lock state of the tape reel by the tape reel lock mechanism is released and the shutter member is opened as the result of the fact the tape cassette is loaded into the recording/reproduction unit.

On the other hand, a connector 139 of the recording/reproduction unit 130 side is positioned at the tape cassette 10 loaded into the recording/reproduction unit 130 in correspondence with the terminal opening portions 77 as shown in FIG. 19. Then, the connector 139 is caused to undergo an operation such that the spring terminals 138 are admitted from the terminal opening portions 77 to come into contact with the contact terminals 73 of the auxiliary memory unit 70 in which closed state by the shutter member 74 has been released by the above-described operation. In this case, the position where the tape cassette 10 and the connector 139 are opposite to each other is determined by suitable positioning means (not shown).

One end of the connector 139 is connected to the write-in/read-out control unit 163. When the spring terminals 138 come into contact with the contact terminals 73, the write-in/read-out control unit 163 is enabled to carry out write and read operations with respect to the MIC 72.

Then, similarly to the above, the write-in/read-out control unit 163 reads out, at the time of recording of data, management information of respective partitions, discrimination information of individual files and management information for carrying out management of recording positions of individual files from a RAM 162 of the tape streamer drive to write them into the MIC 72, and reads out these discrimination information, etc. from the MIC 72 at the time of reproduction of data to write them into the RAM 162.

Moreover, when the tape cassette 10 is taken out from the recording/reproduction unit 130 of the tape streamer drive, the slider 43 of the tape reel lock mechanism 32 is caused to undergo returning operation to the initial position by elastic force of the coil spring 45. As a result, the lock levers 44A, 44B are re-engaged with the engagement teeth 47A, 47B of the tape supply reel 16 and the tape winding reel 17 to place the tape supply reel 16 and the tape winding reel 17 in the lock state. The shutter member 74 is caused to undergo returning operation to the initial position in a manner interlocking with the returning operation of the slider 43 to close the terminal opening portions 77 by the shutter portion 76.

Thus, similarly to the tape cassette 10 shown in the FIGS. 1 to 9 mentioned above, such an approach is employed to read out management information of respective partitions, discrimination information of individual files and management information for carrying out management of recording positions of individual files from MIC 72 as described above, thereby permitting these discrimination information to be read at a high speed. Thus, the content of the file recorded on the magnetic tape 12 can be immediately confirmed.

2. Configuration of the recording/reproduction unit

The configuration of the tape streamer drive of this embodiment will now be described with reference to FIG. 20. This tape streamer drive is adapted to carry out recording/reproduction with respect to the magnetic tape in accordance with the helical scan system by using the tape cassette having tape width of 8 mm.

Figure 20:
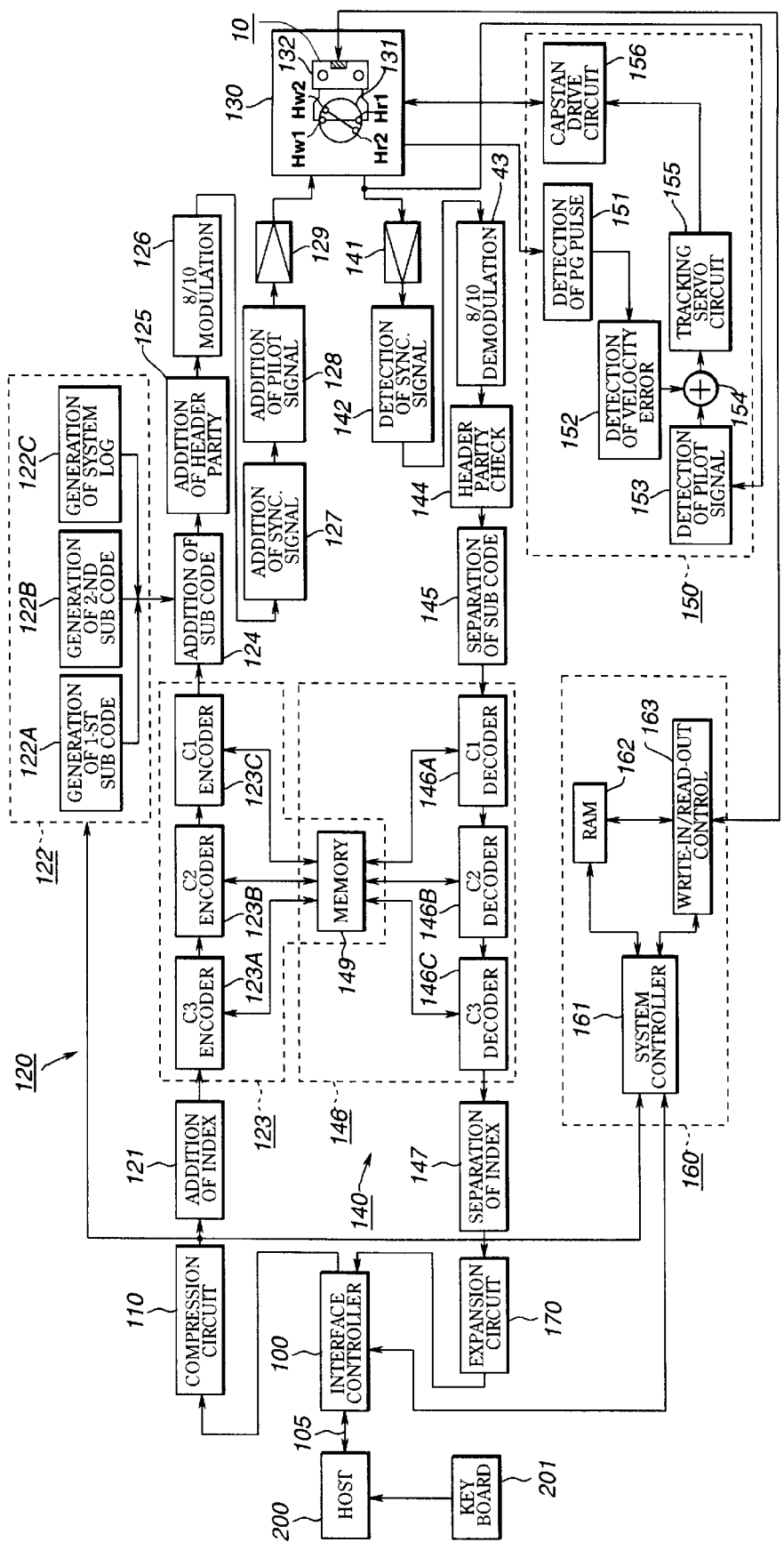
FIG. 20 is a block diagram showing the configuration of tape streamer drive applied to a recording unit/reproducing apparatus (unit) according to this invention.

This tape streamer drive comprises, as shown in FIG. 20, for example, an interface controller 100 for carrying out transmission/reception of data to and from the external, a recording data processing system 120 for implementing signal processing to data inputted through the interface controller 100 to convert it into data of a predetermined format, and a recording/reproduction unit 130 for recording signals delivered from the recording data processing system 120 onto the magnetic tape, and for reproducing the recorded signals from the magnetic tape. Moreover, this tape streamer drive comprises a reproduction data processing system 140 for implementing signal processing to reproduction output from the recording/reproduction unit 130 to reproduce data recorded on the magnetic tape, a tracking control system 150 for controlling the tape traveling system of the recording/reproduction unit 130, and a recording data management unit 160 for carrying out management of data to be recorded onto the magnetic tape.

Moreover, the tape cassette 10 used in this tape streamer drive comprises therein a memory IC (MIC) 11 as a memory element for storing discrimination information for discriminating data and system log recorded on the magnetic tape.

In this tape streamer drive, the interface controller 100 is composed of SCSI (Small Computer System Interface), and serves to deliver, to the recording data processing system 120, data delivered from information processing unit such as personal computer or work station, etc. of the external, and delivers recording data reproduced by the reproduction data processing system 40 to the information processing unit.

In this tape streamer drive, e.g., at the time of recording of data, data are sequentially inputted from a host computer 200 through the SCSI interface 100 by the transmission data unit called record of the fixed length which will be described later, and are delivered to a compression circuit 110. It is to be noted that while there also exists, in such a tape streamer drive system, the mode where data are transmitted from the host computer 200 in units of sets of data of the variable length, the explanation thereof is omitted here. In this example, a key board, etc. is connected to the host computer 200.

At the compression circuit 110, as occasion demands, compression processing is implemented to inputted data by a predetermined system. If, e.g., the compression system by LZ code is employed as one example of the compression system, dedicated codes are allocated with respect to character train processed in the past in this system, and are stored in a form of dictionary. Then, character train inputted subsequently and the content of the dictionary are compared with each other. As a result, if the character train of input data is in correspondence with the code of the dictionary, this character train data is replaced by the code of the dictionary. New codes are sequentially given to the data of the input character train which have not been in correspondence with the codes of the dictionary, and are registered into the dictionary. In a manner as stated above, data of the input character train are registered into the dictionary, and character train data are replaced by the codes of the dictionary. Thus, data compression is carried out.

Moreover, the recording data processing system 120 comprises an index adding section 121 for adding index information to the recording data delivered through the interface controller 100, a sub code generating section 122 for generating sub code, an error correction code generating section 123 for carrying out error correction encoding of the recording data from the index adding section 121, and a sub code adding section 124 for adding, to the recording data which has been caused to undergo error correction encoding, sub code and block address from the sub code generating section 122.

The sub code generating section 122 is composed of first and second sub code generating sections 122A, 122B and a system log generating section 122C. Moreover, the error correction code generating section 123 is composed of a memory 149, a C1 encoder 123A, a C2 encoder 123B, and a C3 encoder 123C.

Further, this recording data processing system 120 comprises a header parity adding section 125 for adding header parity to recording data from the sub code adding section 124, an 8/10 (Eight to Ten Modulation) section 126 for implementing 8/10 modulation to recording data delivered from the header parity adding section 125, a synchronizing (SYNC.) signal adding section 127 for adding a synchronizing signal to recording data delivered from the 8/10 modulation section 126, a pilot signal adding section 128 for adding a pilot signal for ATF (Automatic Track Following) for tracking control to recording data delivered from the synchronizing signal adding section 127, and an amplifier 129 for amplifying recording data delivered from the pilot signal adding section 128.

Further, the recording/reproduction section 130 comprises a rotary drum 131 for obliquely rotating, with respect to the magnetic tape 12, two magnetic heads Hw1, Hw2 for recording respectively having azimuth angles different from each other and two magnetic heads Hr1, Hr2 for reproduction respectively having azimuth angles different from each other. These two pairs of magnetic heads Hw1, Hw2, and Hr1, Hr2 are attached in the axial direction of the rotary drum 131 (i.e., in the track width direction) so as to have a spacing (interval) corresponding to the track pitch Tp in the state close in the circumferential direction of the rotary drum 131, respectively.

Further, the reproduction data system 140 comprises an amplifier 141 for amplifying reproduction output of inclined (tilting) tracks of the magnetic tape 12 delivered from the recording/reproduction section 130, a synchronizing (Sync.) signal detecting section 142 for detecting a synchronizing signal from the reproduction output delivered from the amplifier 141, and binarizes the reproduction output thereafter to carry out time axis correction thereof to output it, a 8/10 demodulation (Eight to Ten Demodulation) section 143 for implementing 8/10 demodulation to the binarized reproduction data from the synchronizing signal detecting section 142, and a header parity check section 144 for checking header parity of the reproduction data from the 8/10 demodulation section 143.

Further, the reproduction data system 140 comprises a sub code separating section 145 for separating sub code from the reproduction data from the header parity check section 144, an error correction processing section 146 for implementing error correction processing to the reproduction data from which the sub code has been separated from the sub code separating section 145, and an index separating section 147 for separating the index from the reproduction data which has been caused to undergo error correction by the error correction processing section 146. The error correction processing section 146 is composed of the memory 149, a C1 decoder 146A, a C2 decoder 146B, and a C3 decoder 146C.

Further, the tracking control system 150 comprises a PG detecting section 151 supplied with PG pulse corresponding to rotation of the rotary drum 131 from the recording/reproduction section 130, a velocity error detecting section 152 for detecting velocity error from a detection output of the PG detecting section 151, a pilot signal detecting section 153 for detecting a pilot signal for ATF from the reproduction output of the recording/reproduction section 130, an adding section 154 for adding respective detection outputs of the velocity error detecting section 152 and the pilot signal detecting section 153, a tracking servo circuit 155 for generating a tracking servo signal on the basis of an added output of the adding section 154, and a capstan drive circuit 156 for controlling the tape traveling system of the recording/reproduction section 130 on the basis of the tracking servo signal.

Further, the recording data management section 160 comprises a system controller 161 for carrying out processing such as management, etc. of data to be recorded onto the magnetic tape, a RAM 162 for holding the discrimination information, and a write-in/read-out control section 163 for controlling write-in and read-out operations, etc. with respect to the RAM 162 through the recording/reproduction section 130.

In operation, the system controller 161 writes, into the RAM 162, as the discrimination information, system log, etc. for carrying out management of partitions provided on the magnetic tape and files, etc. recorded on the magnetic tape. Then, the write-in/read-out control section 163 reads out the system log stored in the RAM 162 to deliver it to the MIC 11 through the recording/reproduction section 130, and writes the system log which has been read out from the MIC 11 into the RAM 162.

An expansion circuit 170 operates on the basis of judgment of the system controller 161 so that when data inputted thereto is considered to be data to which compression has been implemented by the compression circuit 110 at the time of recording, it carries out data expansion processing, while when data inputted thereto is non-compressed data, it passes the inputted data without carrying out data expansion processing to output it.

Output data of the expansion circuit 170 is outputted to the host computer 200 as reproduction data through the SCSI interface 100.

Further, the MIC11 provided in the tape cassette 10 is shown in FIG. 20. This MIC 11 is adapted so that when the tape cassette body is loaded into the tape streamer drive, it is connected to the system controller 161 (write-in/read-out control section 163) through the terminal pins 63 shown in FIG. 2 so that input/output of data can be carried out.

In addition, mutual transmission of information is carried out by using command of the SCSI between the MIC 11 and the external host computer 200. For this reason, there is no necessity of particularly providing the dedicated line between the MIC 11 and the host computer 200. Resultantly, transmission/reception of data between the tape cassette and the host computer 200 can be carried out only by the SCSI interface controller 100.

3. Operation of the recording/reproduction unit

The operation of the tape streamer drive will now be described. In this tape streamer drive, in carrying out recording, recording data is delivered from an information processing equipment such as personal computer or work station, etc. through the interface controller 100. The interface controller 100 is operative so that when recording data is delivered through a bus 105, the recording data thus delivered is delivered to the index adding section 121 and the sub code generating section 122.

The index adding section 121 is operative so that when recording data is delivered from the interface controller 100, index information for discriminating a series of recording data is added to the delivered recording data every unit in which, e.g., 40 tracks, i.e., 20 frames are caused to be unit (which will be described later) to deliver the index information added recording data to the error correction code generating section 123.

The error correction code generating section 123 temporarily stores the recording data delivered from the index adding section 121 into the memory 149 every unit. Then, the C3 encoder 123C generates error correction code C3 of data train corresponding to the track width direction as described later with respect to the recording data every unit stored in the memory 149 to allocate the error correction code C3 to the last 2 tracks of the 40 tracks of one unit. Moreover, the C2 encoder 123B generates error correction code C2 of data train corresponding to the track direction as described later to halve this error correction code C2 into two parts to allocate them to the both end portions of the main data areas of respective tracks. Further, the C1 encoder 123A generates error correction codes C1 every respective block as described later.

On the other hand, the first sub code generating section 122A of the sub code generating section 122 generates, on the basis of recording data inputted through the interface controller 100, separate count which is delimit information indicating delimitation of recording data or record count indicating the number of records, etc. Moreover, the second sub code generating section 122B generates, along with block address, area ID indicating respective areas, frame No., group count indicating the number of recording units, or check sum, etc. defined on the tape format. Further, the system log generating section 122C generates system logs (past record information) every respective partitions prescribed as the tape format.

Moreover, the sub code adding section 124 adds sub code and block address delivered from the sub code generating section 122 to the recording data to which the error correction codes C3, C2, C1 have been added by the error correction code generating section 123. Thus, the sub codes and the block addresses are allocated to the second areas of the above-described respective blocks. Further, this sub code generating section 124 allocates area ID and/or block addresses, etc. generated at the second sub code generating section 122B as described above to respective blocks of the above-described two sub areas (sub 1, sub 2). In addition, the sub code adding section 124 constitutes sub code from count value generated by the first code generating section 122A and area ID, group count and check sum, etc. generated by the second sub code generating section 122B to allocate them to respective blocks of the two sub areas.

The header parity adding section 125 generates 2 byte parity for error detection with respect to the sub codes and the block addresses added to the recording data by the sub code adding section 124 to add this 2 byte parity to the recording data. Thus, the 2 byte parity is allocated to the third areas of the above-described respective blocks. In addition, this header parity adding section 125 adds parity of 1 byte also to respective blocks of the two sub areas (sub 1, sub 2).

The 8/10 modulation section 126 converts recording data of the main data area to which header parity and block address have been added by the header parity adding section 125 and recording data of respective blocks of the two sub areas so that 8 bits are changed into 10 bits in one byte units, thus holding d.c. level of a signal to be recorded at substantially zero (0).

Moreover, the synchronizing signal adding section 127 adds synchronizing signal, every block, to the recording data converted into 10 bit data by the 8/10 modulation section 126. Thus, the synchronizing signal is allocated to the first areas of the above-described respective blocks. Then, the synchronizing signal adding section 127 delivers the recording data thus formed to the pilot signal adding section 128.

The pilot signal adding section 128 generates the pilot signal for ATF to add the ATF pilot signal to the recording data to deliver it to the magnetic heads Hw1, Hw2 through the amplifier 129. Thus, these magnetic heads Hw1, Hw2 scans on the magnetic tape to carry out recording, whereby recording tracks are formed by a predetermined format on the magnetic tape.

Here, prior to recording as described above, partitions may be prepared in advance on the magnetic tape 12. In this case, the system controller 161 prepares partitions on the magnetic tape thereafter to prepare management information of the partitions indicating the number of the partitions and start positions of the respective partitions, etc. to write them into the RAM 162.

Moreover, the system controller 161 is operative so that in the case where directory is prepared, deleted (erased) or changed within the partition, in the case where file is recorded, deleted or changed within the directory, or in similar cases, it reads out discrimination information of individual files from the RAM 162 to change them in correspondence with the recording, etc. thereafter to write them into the RAM 162. Further, the system controller 161 is operative so that in the case where recording, deletion (erasing) or change of file is carried out, it reads out management information for carrying out management of recording positions of individual files from the RAM 162 to change them in accordance with new recording position of file thereafter to write them into the RAM 162.

Then, the write-in/read-out control section 163 is operative so that when management information of respective partitions, discrimination information of individual files and/or management information for carrying out management of recording positions of individual files stored in the RAM 162 are updated, it writes the updated management information of respective partitions into the MIC 11 through the connector 137 of the recording/reproduction 130 and the contact terminals 63.

Thus, data are recorded in file units onto the magnetic tape 12, and discrimination information of individual files, etc. recorded on the magnetic tape 12 is recorded into the MIC 11.

Moreover, in the case where data are recorded onto plural tape cassettes 10, the system controller 161 generates information relating to all the tape cassettes 10 on which data are recorded, discrimination information for discriminating between respective tape cassettes 10 onto which data are recorded, and discrimination information for discriminating between data recorded on the respective tape cassette 10. Thus, the write-in/read-out control section 163 stores these discrimination information into the RAM 162.

Further, in this tape streamer drive, in reproducing the magnetic tape onto which recording has been made as described above, when the tape cassette 10 is loaded into the recording/reproduction unit 130, the contact terminals 63 are exposed from the terminal opening portion 51. As a result, the exposed contact terminals 63 are connected to the write-in/read-out control section 163 through the connector 137.

Then, the write-in/read-out control section 163 reads out the management information, discrimination information for individual files, and management information for carrying out management of recording positions of individual files which have been described above from the MIC 11 through the connector 137 and the contact terminals 63 to write them into the RAM 162.

On the other hand, the recording/reproduction unit 130 is operative so that when reproduction of the magnetic tape 12 is designated from the system controller 161, it controls rotation of the rotary drum 131 so that the number of rotations of the rotary drum 131 becomes equal to that at the time of recording, and controls traveling of the magnetic tape 12 so that the magnetic tape 12 travels at a constant velocity. Thus, the reproduction recording heads Hr1, Hr2 scans on the magnetic tape in an inclined state, and these magnetic heads Hr1, Hr2 deliver reproduction outputs corresponding to scanning of the recording tracks to the synchronizing signal detecting section 142 through the amplifier 141. The synchronizing signal detecting section 142 detects the synchronizing signal from the delivered reproduction output to binarize the reproduction output by a clock (clock signal) synchronous with the synchronizing signal to generate reproduction data to deliver it to the 8/10 demodulation section 143.

The 8/10 demodulation section 143 converts reproduction data from the synchronizing signal detecting section 142 from 10 bit data to 8 bit data to deliver the 8 bit data thus obtained to the header parity check section 144. The header parity check section 144 carries out parity check of sub code and block address by using the above-described header parity of 2 bytes. Then, the sub code separating section 145 separates, from the reproduction data, correct sub code which has been caused to undergo parity check by the header parity check section 144 to deliver it to the system controller 161, etc., and to deliver, to the memory 149, the reproduction data from which the sub code has been separated.

The memory 149 temporarily stores, every unit, reproduction data to which the index information has been added with reproduction data corresponding to 40 tracks, i.e., 20 frames being as one unit. Then, the C1 decoder 146A implements error correction processing to reproduction data of respective blocks by using the above-described error correction codes C1 added every respective blocks on the basis of reproduction data every unit stored in the memory 149.

Moreover, the C2 decoder 146B implements error correction processing to data train corresponding to the track direction by using the error correction codes C2 added to the both end portions of the reproduction data area of the above-described respective tracks with respect to reproduction data every unit to which error correction processing has been implemented by the C1 decoder 146A. Further, the C3 decoder 146C implements error correction processing to data train corresponding to the track width direction by using error correction code C3 allocated to the last two tracks of the above-described 40 tracks of one unit with respect to reproduction data every unit to which error correction processing has been implemented by the C2 decoder 146B.

In this tape streamer drive, since error correction processing is implemented to reproduction data by using the error correction codes C1, C2, C3 as described above, it is possible to securely correct error of the reproduction data. Thus, reliability of the reproduction data can be improved.

Moreover, the index separating section 147 separates index information from reproduction data every unit to which the error correction processing has been implemented by the error correction processing section 146 as described above to deliver it to the system controller 161, etc., and to deliver, to the interface controller 100, the reproduction data from which the index information has been separated.

Then, the interface controller 100 transmits reproduction data from the index separating section 147 to the host computer 200 such as personal computer or work station, etc. through the bus 105.

4. Structure of data recorded on the magnetic tape

Outline of the data format applied to the above-described data storage system composed of the tape streamer drive and the tape cassette will now be described.

Figure 21:
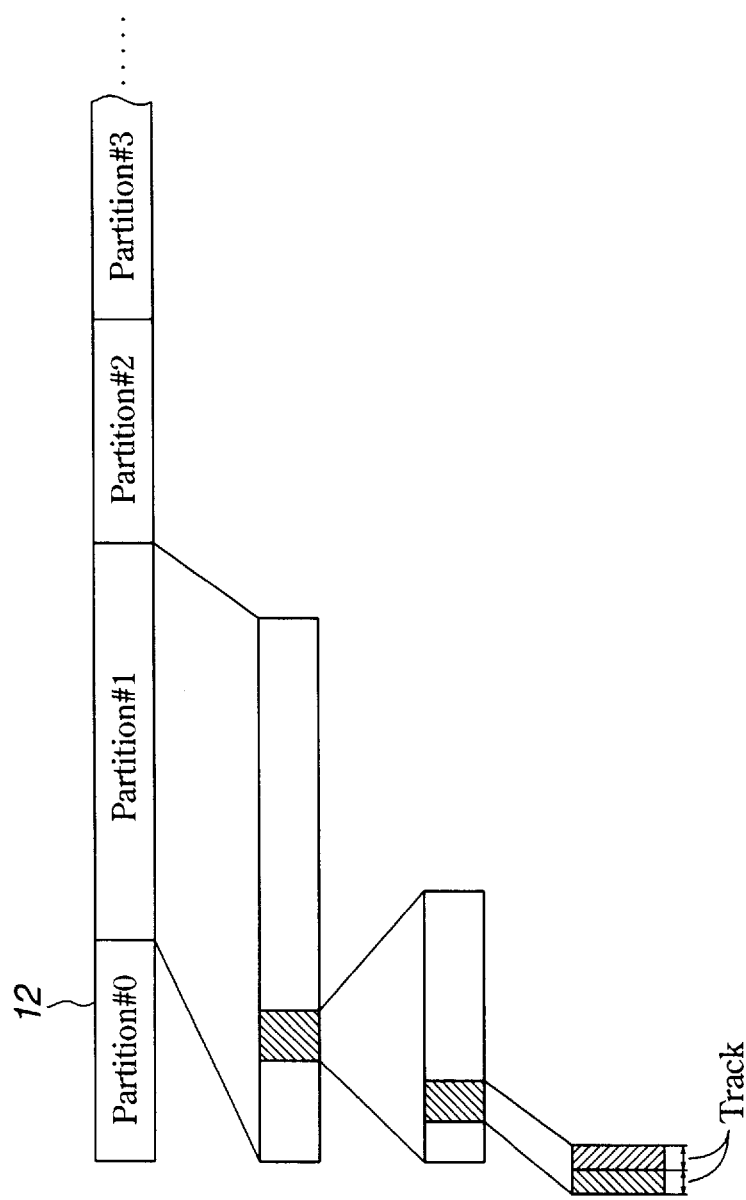
FIG. 21 is a model view showing the structure of data recorded onto magnetic tape in the tape streamer drive.

FIG. 21 shows the structure of data recorded onto the magnetic tape. A single magnetic tape designated at the same reference numeral 12 as above is shown in a model form in FIG. 21A. In this embodiment, as shown in FIG. 21B, it is assumed that the single magnetic tape 12 can be utilized in the state divided in partition units. In the case of the system of this embodiment, management can be made such that the number of partitions is set to 256 at the maximum. In addition, the respective partitions shown in this figure are such that partition numbers are given thereto as respectively indicated by partitions #0, #1, #2, #3 . . . so that those partitions are caused to undergo management.

Accordingly, in this embodiment, it is possible to carry out recording/reproduction, etc. of data respectively independently every partitions. For example, the recording unit of data within one partition shown in FIG. 21B can be divided into units of the fixed length called group shown in FIG. 21C. Recording with respect to the magnetic tape 12 is carried out by the units every these groups.

In this case, one group corresponds to data quantity of 20 frames, and one frame is formed by two tracks as shown in FIG. 21D. In this case, two tracks forming one track are caused to be tracks of plus azimuth and minus azimuth adjacent to each other. Accordingly, one group is formed by 40 tracks.

Figure 22:
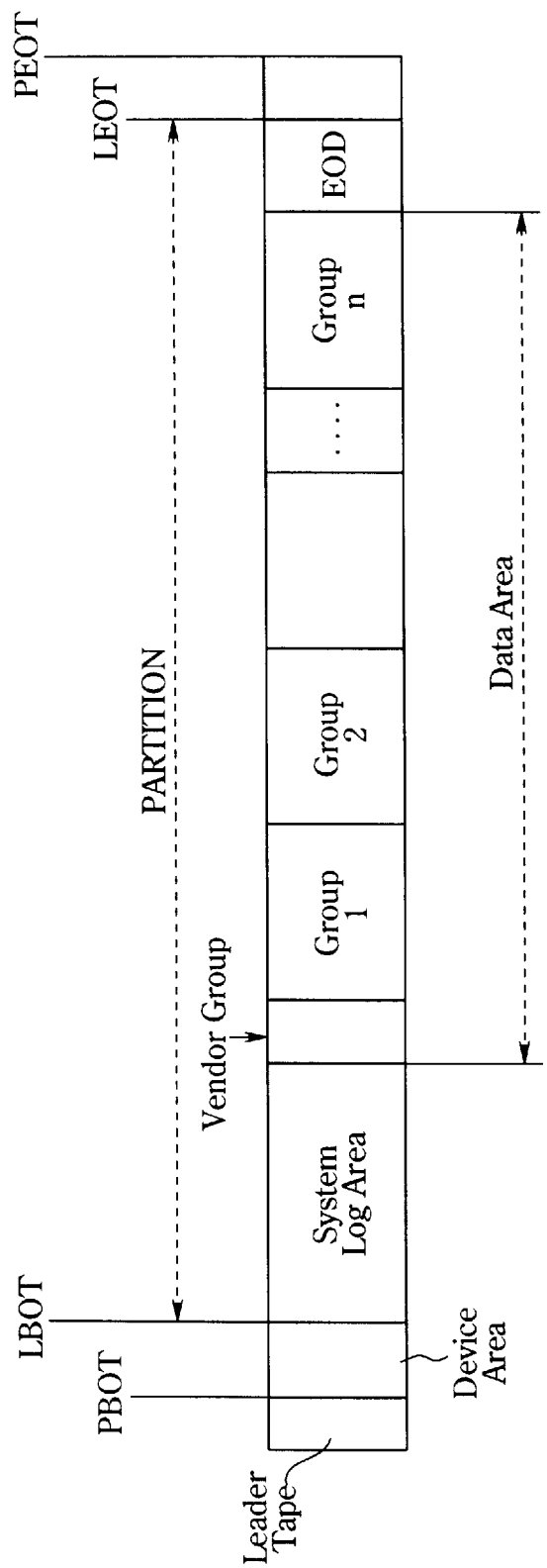
FIG. 22 is a model view showing data structure within one (1) partition of the magnetic tape.

Moreover, the one partition shown in the FIGS. 21A, 21B mentioned above is formed by the data structure shown in FIG. 22. It is to be noted that explanation will be given on the assumption that one partition is formed with respect to the entire tape length in FIG. 22. Further, while, as the form of this embodiment, THE MIC 11 is provided at the tape cassette 10 and data structure on the magnetic tape which will be described later in detail is employed so that loading/ unloading in the middle of the tape can be made, disclosure is made also with respect to the general format capable of also coping with the tape cassette provided with no MIC.

In the case of the FIG. 22 mentioned above, leader tape is located at the leading position physically with respect to the initial (leading) portion of the magnetic tape, and device area serving as the area where loading/unloading of the tape cassette is carried out is provided succeedingly (subsequently) thereto. The leading portion of the device area is caused to be the leading position PBOT (Physical Beginning of Tape). Succeedingly (subsequently) to the device area, system log area where use past record information of tape, etc. is stored in provided. At the area succeeding (subsequent) thereto, data area is provided. The leading portion of the system log area is caused to be logical start position of tape LBOT (Logical Beginning of Tape).

In this data area, vendor group indicating information relating to vendor supplied with data prepared is provided in the beginning. Succeedingly (Subsequently), plural groups actually shown in FIG. 21C are successively recorded as indicated by groups 1~n in this example. Succeedingly (Subsequently) to the last group n, area of EOD (End of Data) indicating end of the data area of partition is provided. The end portion of the EOD is caused to be logical end position of tape LEOT (Logical End of Tape).

PEOT (Physical End of Tape) indicates physical end position of tape, or physical end position of partition.

Figure 23A:
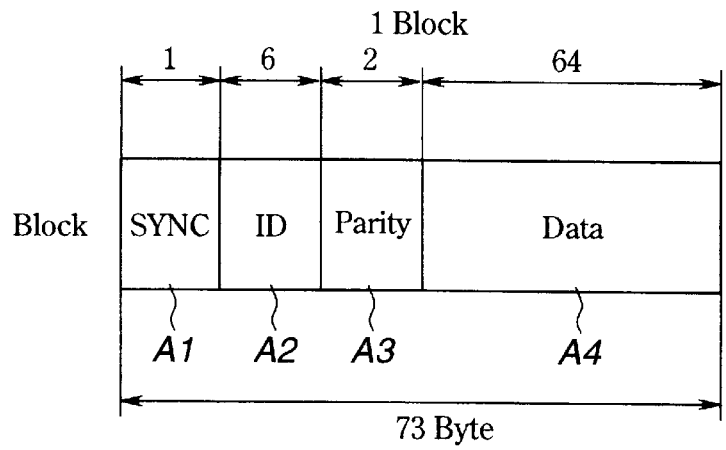
FIG. 23 is a model view showing data structure of one (1) track of the magnetic tape.
Figure 23B:
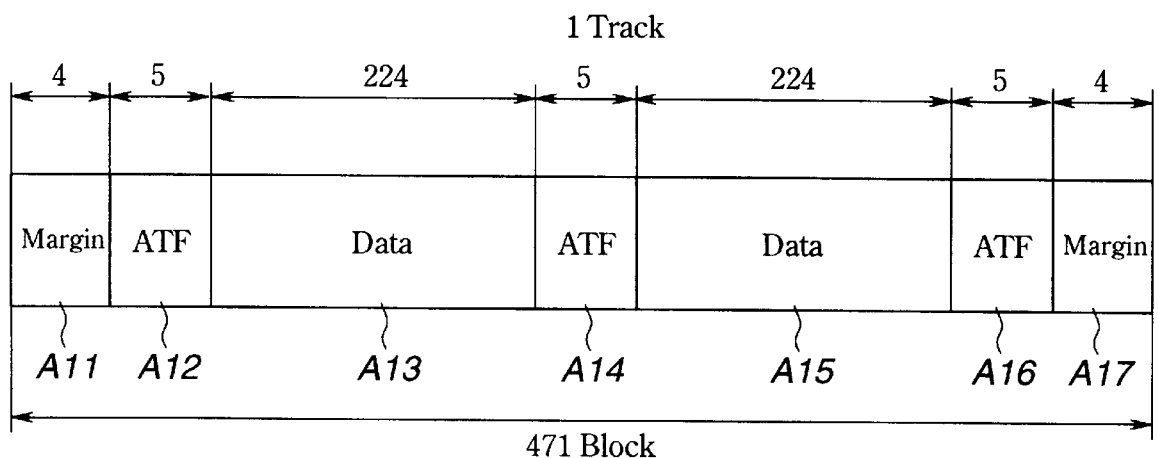

The structure of the data corresponding to one track shown in FIG. 21D is shown in FIGS. 23A and 23B. In FIG. 23(A), the data structure of the Block unit is shown. One block is formed by ID area A2 of 6 bytes, parity area A3 for error correction consisting of 2 bytes for ID data, and data area A4 of 64 bytes succeedingly (subsequently) to SYNC data area A1 of 1 byte.

Further, the data corresponding to one track shown in FIG. 23B is formed by 471 blocks as a whole, and one track is such that margin areas A11, A17 corresponding to 4 blocks are provided at the both ends, and ATF areas A12, A16 for tracking control are respectively provided after the margin area A11 and before the margin area A17. In addition, ATF area A14 is provided at the intermediate portion of one track. As these ATF areas A12, A14, A16, areas corresponding to 5 blocks are respectively provided. Between the ATF areas A12 and A14 and between the ATF areas A14 and A16, data areas A13, A15 corresponding 224 blocks are respectively provided. Accordingly, the entire data area (A13 and A15) within one track occupies 224×2=448 blocks of the entire 471 blocks.

Figure 23C:
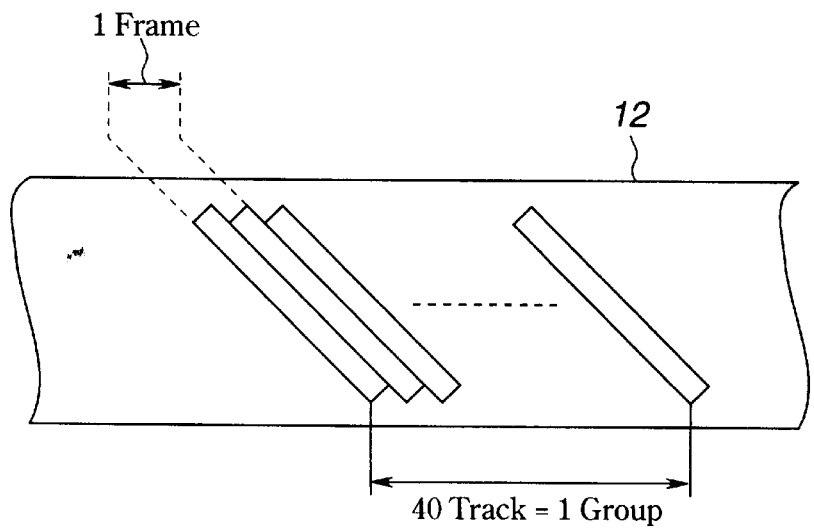

The above-mentioned tracks are physically recorded as shown in FIG. 23C onto the magnetic tape 12, and 40 tracks (=20 frames) are caused to be one group as previously described.

Moreover, in this tape streamer drive, the data area is divided into 448 blocks with 73 bytes being as one block. Further, one block is divided into the first area of 1 byte where synchronizing signal is recorded, the second area of 6 bytes where ID is recorded, the third area of 2 bytes where header parity is recorded, and the fourth area of 64 bytes where data are recorded, and sub codes and block addresses are recorded along with data every respective blocks.

Figure 24:
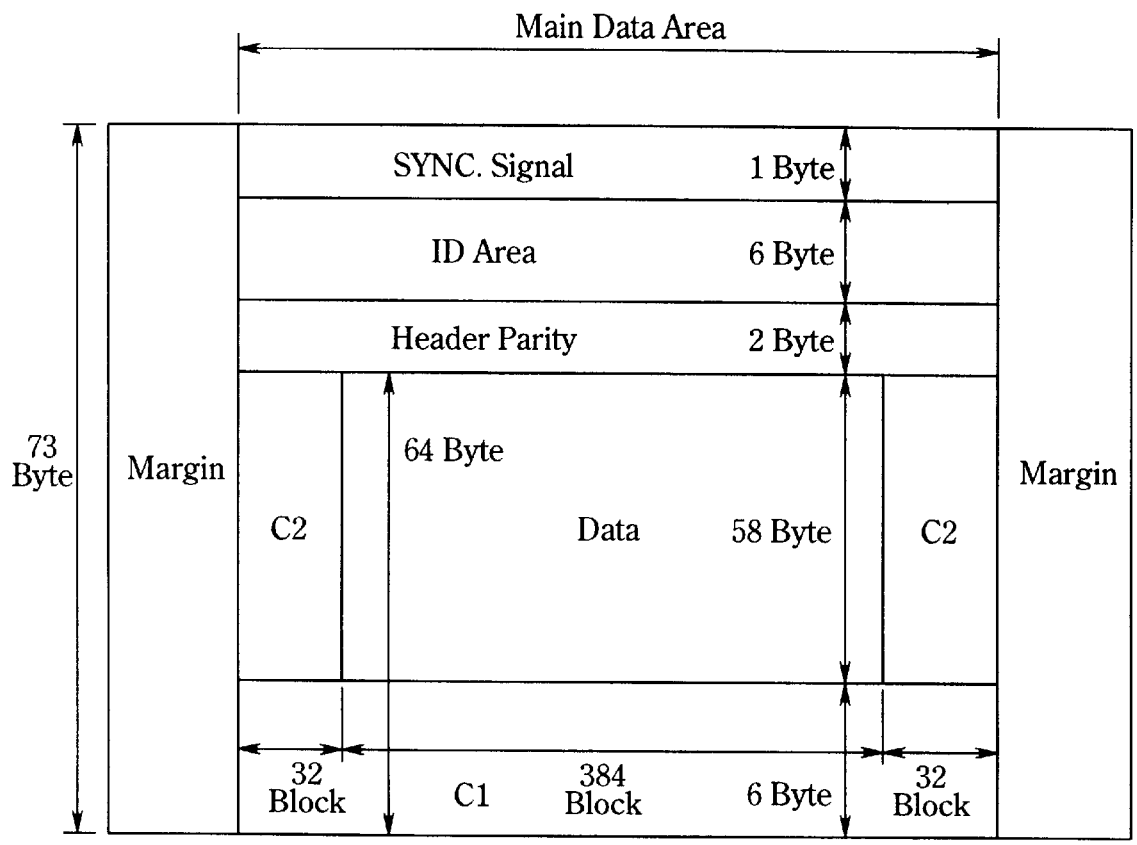
FIG. 24 is a view showing data configuration corresponding to one (1) track of data recorded onto magnetic tape by the tape streamer drive.

As shown in FIG. 24, data recorded in the fourth area is of a structure in which data corresponding to 64 bytes×448 blocks in which error correction codes C2, C1 of the two-dimensional configuration are added every data of 58 bytes×384 blocks, i.e., 22272 bytes are distributed every respective blocks. As shown in FIG. 24, the error correction code C1 is recorded in the state added to main data every respective blocks, and the error correction codes C2 are recorded in the state halved into respective 32 blocks of the both end portions of the main data areas of the respective tracks.

Figure 25:
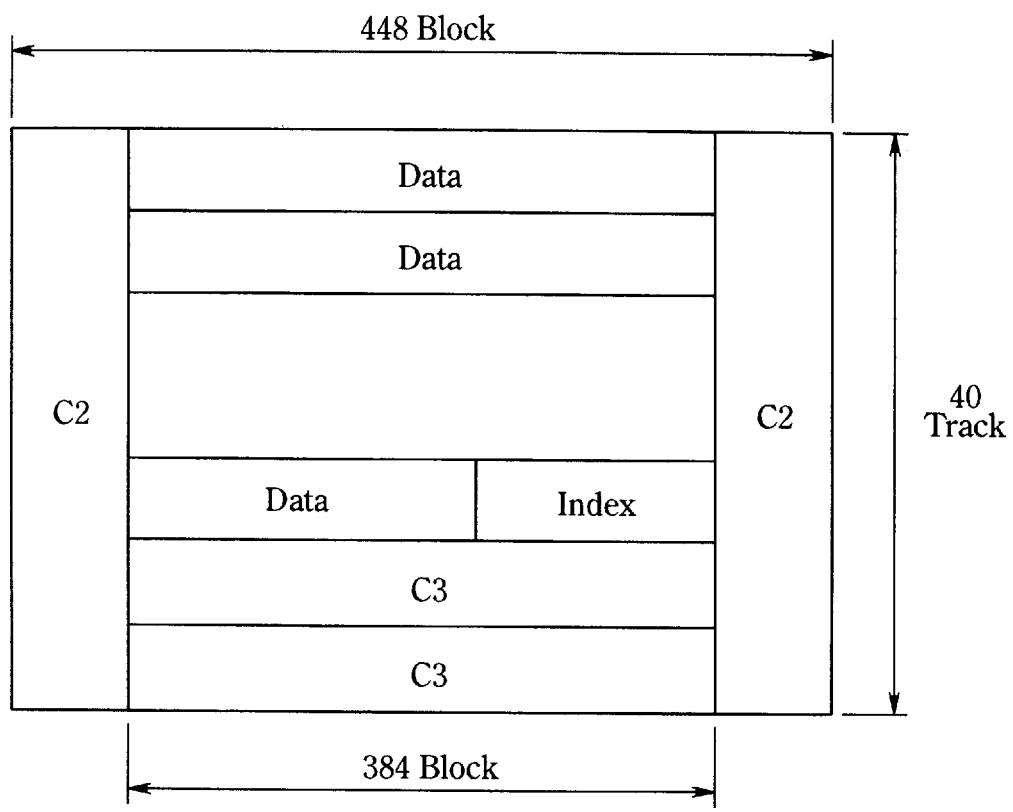
FIG. 25 is a view showing the data configuration corresponding to 40 tracks of one unit of data recorded onto magnetic tape by the tape streamer drive.

Moreover, in this tape streamer drive, there is employed a code configuration for error correction in which 40 tracks, i.e., 20 frames are caused to be one unit (group) as 2 tracks, i.e., one frame corresponding to 942 blocks. As shown in FIG. 25, recording is carried out with error correction codes C2 of data train corresponding to the track direction being disposed (allocated) at the both sides of track, and recording is carried out with error correction codes C3 of data train corresponding to the track width direction being allocated to the last 2 tracks of the 40 tracks. Additionally, index information for discriminating a series of data is added every one unit.

In addition, as the sub code, separator count which is delimit information indicating delimitation of main data, record count indicating the number of records, area ID indicating respective areas defined on the tape format, frame No. indicating absolute position of the recording unit, group count indicating the number of recording units, or check sum, etc. are recorded.

5. ID area

The ID area A2 shown in FIG. 23A will now be described with reference to FIGS. 26 to 30.

Figures 26, 27:
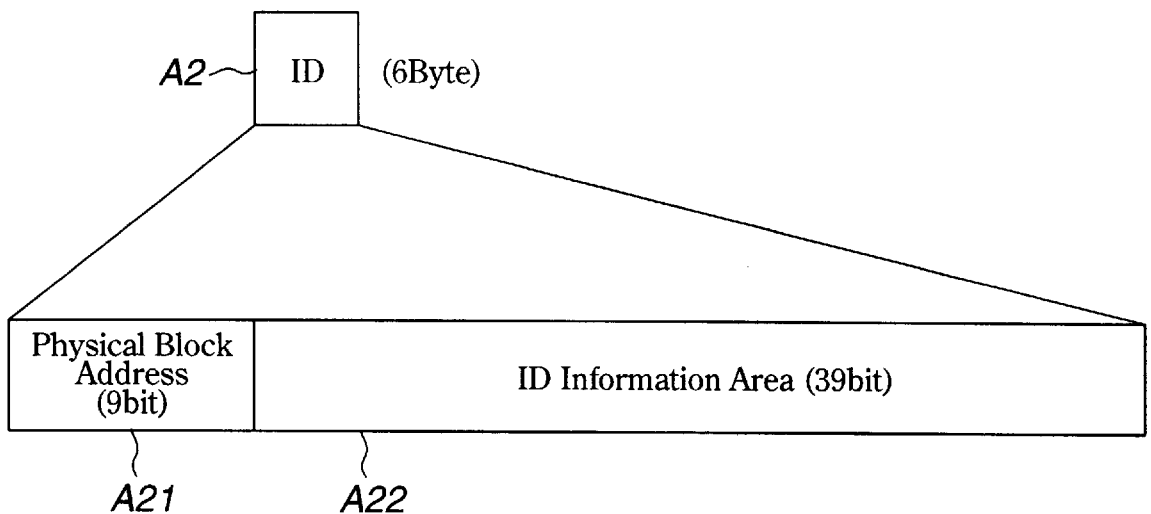
FIG. 26 is a model view showing the data structure of ID area of the magnetic tape.
FIG. 27 is a model view showing physical block address number on one (1) track of the magnetic tape.

The ID area A2 is caused to be of the data structure as shown in FIG. 26, and consists of Physical Block Address A21 of 9 bits, and ID information area A22 of 39 bits succeeding (subsequent) thereto.

As previously described, since all the data areas (A13 and A15) within one track consist of 448 blocks, the number of physical block addresses A21 included in all the data areas is also caused to be 448. Address values are given to these 448 physical block addresses A21 in a manner to increment within the range of 0 to 447 in the decimal representation in order from the physical block address A21 located at the leading position of one track as indicated in a model form in FIG. 27, for example.

Thus, by the recording/reproduction unit side, for example, it becomes possible to reasonably handle information of the ID information area A22 included in the data area within one track. In this case, data size of the ID information area A22 included in the data area within one track becomes equal to 2,184 bytes as indicated by the following formula:

$$39 \text{ (Bits)} \times 448 \text{ (Blocks)} = 17{,}472 \text{ (Bits)}$$
$$= 2{,}184 \text{ (Bytes)}$$

Kind of the ID area information stored in the ID information area A22 shown in FIG. 26 is as shown in FIG. 28. Respective ID area information shown in FIG. 28 are stored with respect to areas of ID information areas A22, A22 . . . of 2,184 bytes in total included in the data area on one track in such a manner that they are allocated in accordance with a predetermined rule. Moreover, in consideration of permitting reliable read-out operation of ID area information by the tape streamer drive, ID area information of the same kind are recorded plural times in accordance with a predetermined rule every track.

In the FIG. 28 mentioned above, the Raw Format ID (16 bits) indicates the type of the fundamental format relating to the magnetic tape. In the case of this embodiment, information, e.g., track pitch, data size of 1 frame, the number of blocks included within 1 track, data size of 1 block, tape length, tape thickness and material of tape, etc. are indicated. The Logical Format ID (8 bits) indicates type of recording format actually used.

As shown in FIG. 28, Logical Frame ID (8 bits) consists of Last Frame ID (1 bit), ECC Frame ID (1 bit) and Logical Frame Number (6 bits). The last frame ID indicates whether or not current frame where corresponding ID area is included is the last frame within the group, and the ECC frame ID indicates whether or not recording data of the data area of the current frame is caused to be ECC (Error Correction Code).

Moreover, one group consists of 20 frames as previously described, and the Logical Frame No. indicates that corresponding frame is which frame within the current group.

Partition ID (16 bits) indicates Partition No. of partition including current frame.

Area ID (4 bits) indicates area where corresponding frame belongs to. Data ID (4 bits) indicates type of the processing form of data based on the recording format, and N-position (4 bits) and N-Repeats (4 bits) are areas where information relating to data corresponding to the multiplexing recording mode are respectively defined.

Group Count (24 bits) indicates total number of groups up to the group where corresponding frame is included in the current partition. Moreover, File-Mark Count (32 bits) indicates, in the current partition, total number of file marks included from the start position thereof up to the current group. File-Mark is information indicating de-limitation of data file within one partition.

Save-Set Mark Count (32 bits) indicates, in the current partition, total number of file marks included from the start position thereof up to the current group. Save-set mark is information indicating de-limitation of the data save position within one partition.

Record Count (32 bits) indicates, in the current partition, total number of records included from the start position thereof up to the current group. Absolute Frame Count (24 bits) indicates, in the current partition, total number of frames included from the start position thereof up to the current group. In addition, Reserved area is provided in preparation for future supplement of ID area information, etc.

It is to be noted that definition of ID area information and the number of bits given to respective ID area information shown in FIG. 28 are only one example, and they may be changed in dependency upon actual use condition.

The Area ID which is the essential point of this embodiment of various ID area information shown in the FIG. 28 mentioned above will now be described.

FIG. 29 indicates the content of definition of the area ID. In this case, bit numbers (3-2-1-0) are respectively attached to 4 bits forming area ID. In the case where respective values of the bit numbers (3-2-1-0) are expressed as [0000] as shown in FIG. 29, it is defined that corresponding area is Device Area. In the case where they are expressed as [0001], corresponding area is caused to be Reference Area. In the case where they are expressed as [0010], corresponding area is caused to be System Log Area. In the case where they are expressed as [0011], corresponding area is caused to be Reserved.

Moreover, when expressed as [0100], corresponding area is caused to be Data Area; when expressed as [0101], corresponding area is caused to be EOD area; when expressed as [0110], corresponding area is caused to be Reserved; and when expressed as [0111], it is defined that corresponding area is Option Device Area except for the essential device area shown in FIG. 22 and for carrying out loading/unloading of the magnetic tape 12. This Option device Area will be described later.

It is to be noted that number shown within parentheses () in respective rows where values of bits of the bit numbers (3-2-1-0) in FIG. 29 are assumed to indicate respective bit values by the decimal notation.

An example of ID area information to be written into the ID information area A22 of the EOD area (see FIG. 22) is shown in FIG. 30.

FIG. 30 shows the content of ID area information stored into the ID information area A22 in one EOD area, wherein delimiting portions every longitudinal columns are caused to be 1 frame unit. In addition, numeric values shown in FIG. 30 are indicated by the decimal notation.

It is prescribed that the EOD area is recorded onto the magnetic tape 12 as the area substantially consisting of, e.g., 300 frames. In the FIG. 30 mentioned above, the absolute frame count in the start frame of the EOD area is caused to be "654", and the absolute frame count of the last frame of the EOD area is caused to be "954". This indicates that the EOD area is formed by 301 frames in total positioned from the 654-th frame to the 954-th frame within the current partition.

Moreover, as previously explained with reference to FIG. 29, in the case where 4 bits of the area ID is caused to be [1, 1, 0, 1], i.e., "5" in the decimal notation, it is defined that corresponding area is EOD area. In FIG. 30, in accordance with the above-mentioned definition, area ID within respective frames of the EOD area are caused to be all "5" in the decimal notation, and indicate that all frames from the 654-th frame to the 954-th frame belong to the EOD area.

It is to be noted that since values given to other ID area information are considered to correspondingly change by the actual tape format and/or past record of the recording/reproduction operation, its explanation is omitted, and "0" are attached here as values every respective frames and description of actual numeric values is omitted.

It should be noted that, in fact, in the case where value of "0" is given with respect to respective ID area information, a predetermined information content corresponding to the value of "0" is defined. In the case where value of the format ID is actually caused to be "0" as an example, it is indicated that corresponding frame is data recorded on the basis of "SDX1 format".

6. Data Structure of MIC (a) Data Structure of the entirety of MIC

The structure of data of the MIC 11 provided at the tape cassette 10 will now be described.

Figure 31:
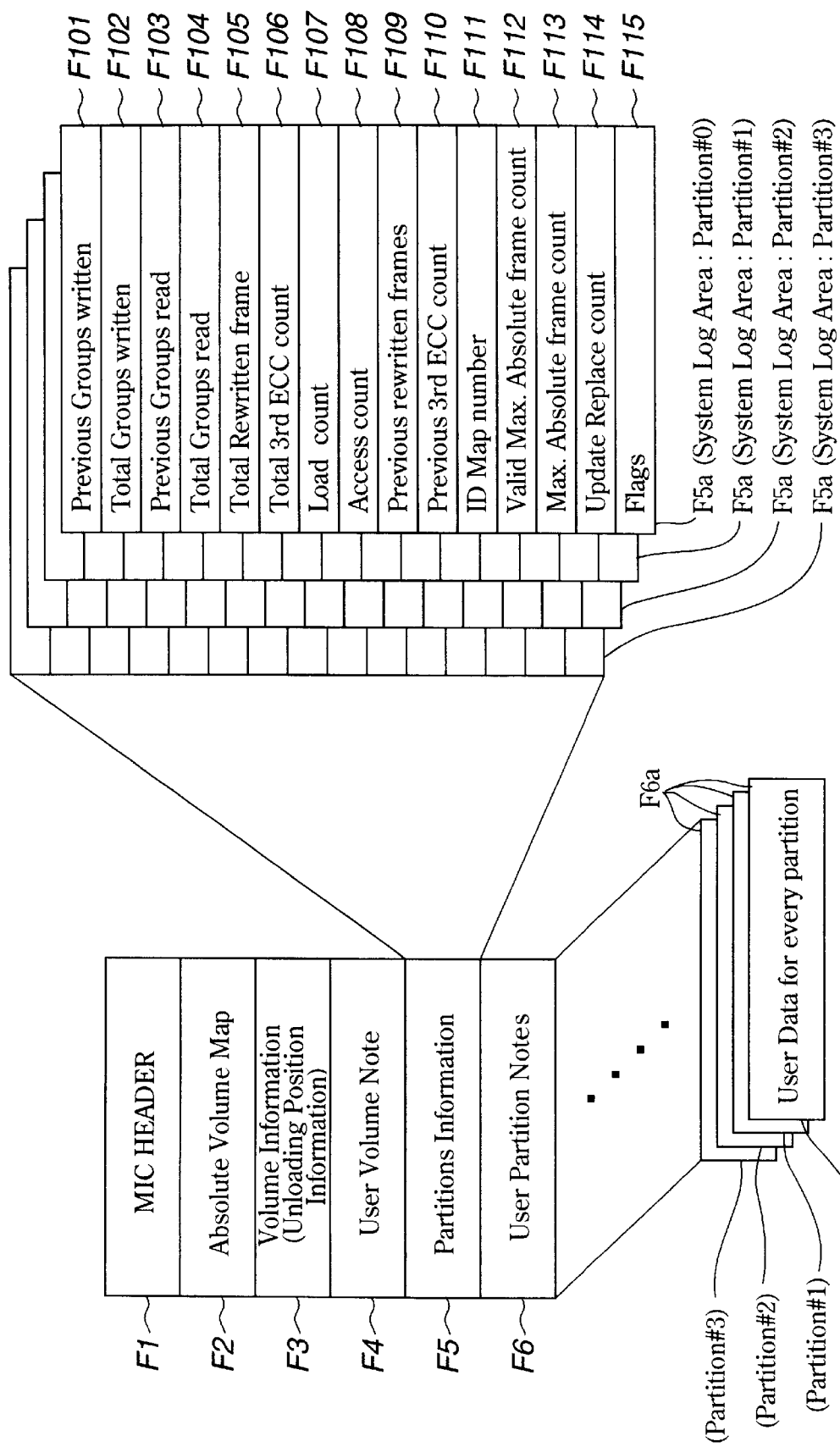
FIG. 31 is a model view showing data structure of MIC in tape cassette within which the magnetic tape is accommodated.

FIG. 31 shows the structure of data stored into the MIC 11. The capacity of the MIC 11 is caused to be, e.g., 2 mega bytes, and fields F1 to F6 are set with respect to the area therefor as shown in FIG. 31.

In these fields F1 to F6, the field F1 is caused to be MIC HEADER, wherein various information at the time of manufacturing of the tape cassette and tape information at the time of initialization and or information every partition, etc. are written.

Moreover, the field F2 is caused to be Absolute Volume Map, wherein absolute position information relating to data recorded with respect to, e.g., the magnetic tape of one volume is stored.

The field F3 is caused to be Volume Information, wherein various use past record information relating to the magnetic tape of one volume are stored. Information stored in these areas are utilized for recording/reproduction control, etc. in the tape streamer drive. In this embodiment, there is provided an area for storing "unloading position information" as information indicating the last unloading position as indicated within the parenthesis () of FIG. 31 with respect to the volume information.

The field F4 is caused to be User Volume Note, wherein information that user (vendor, etc.) has provided in regard to the tape cassette itself is stored. Such information is delivered to the host computer 200 of the external as occasion demands so that it can be utilized for the purpose of a required processing control.

The field F5 is caused to be Partition Information. Various information relating to use past record with respect to the magnetic tape every partitions written onto the magnetic tape are stored therein. The tape streamer drive utilizes them as information for carrying out management of the own recording/reproduction operation. This partition information is formed by the area of the system log area F5*a* as shown in FIG. 31.

Since the system log area F5*a* is prepared correspondingly every partitions actually recorded on the magnetic tape, the number of tables of the system log areas F5*a* becomes in correspondence with the number of partitions provided on the magnetic tape. In addition, in this embodiment, the area of the system log area on the magnetic tape previously shown in FIG. 23 is formed so that information of the content similar to that of the system log area F5*a* within the MIC can be written. The data structure within the system log area F5*a* will be described later.

The field F6 is caused to be User Partition Notes, and various information such as comment, etc. that user can write every partition are stored therein.

Figure 32:
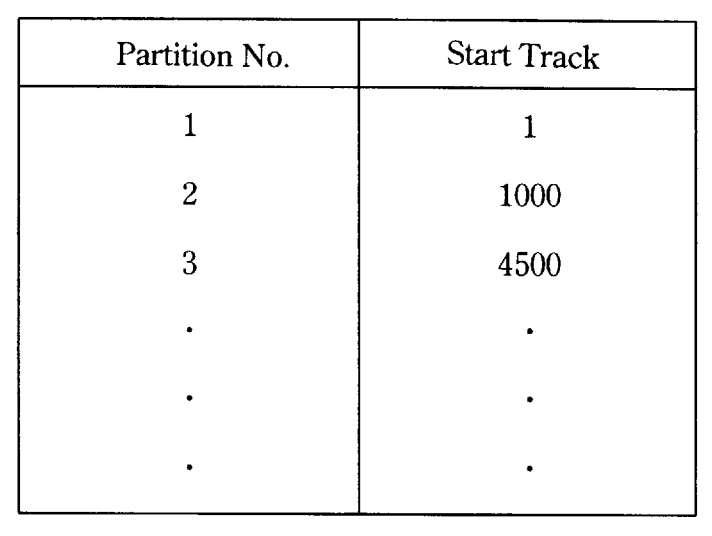

In more practical sense, as shown in FIG. 32, management information of respective partitions consists of partition No. for discriminating respective partitions and start track No. indicating start track of partition corresponding to the concerned partition number. In the case shown in FIG. 32, partitions of which partition numbers are 1, 2 and 3 indicate that partitions start from tracks of which track numbers are respectively 1, 1000 and 4500, respectively.

Moreover, at least one directory is prepared in each partition, and the systems log every partition consists of discrimination information of individual files recorded within respective directories as shown in FIG. 33. As shown in this figure, discrimination information of individual files each consists of attribute indicating attribute/preparation date of file, etc., start track indicating recording start track of file, and file size indicating capacities (sizes) of individual files, etc.

Figure 34:
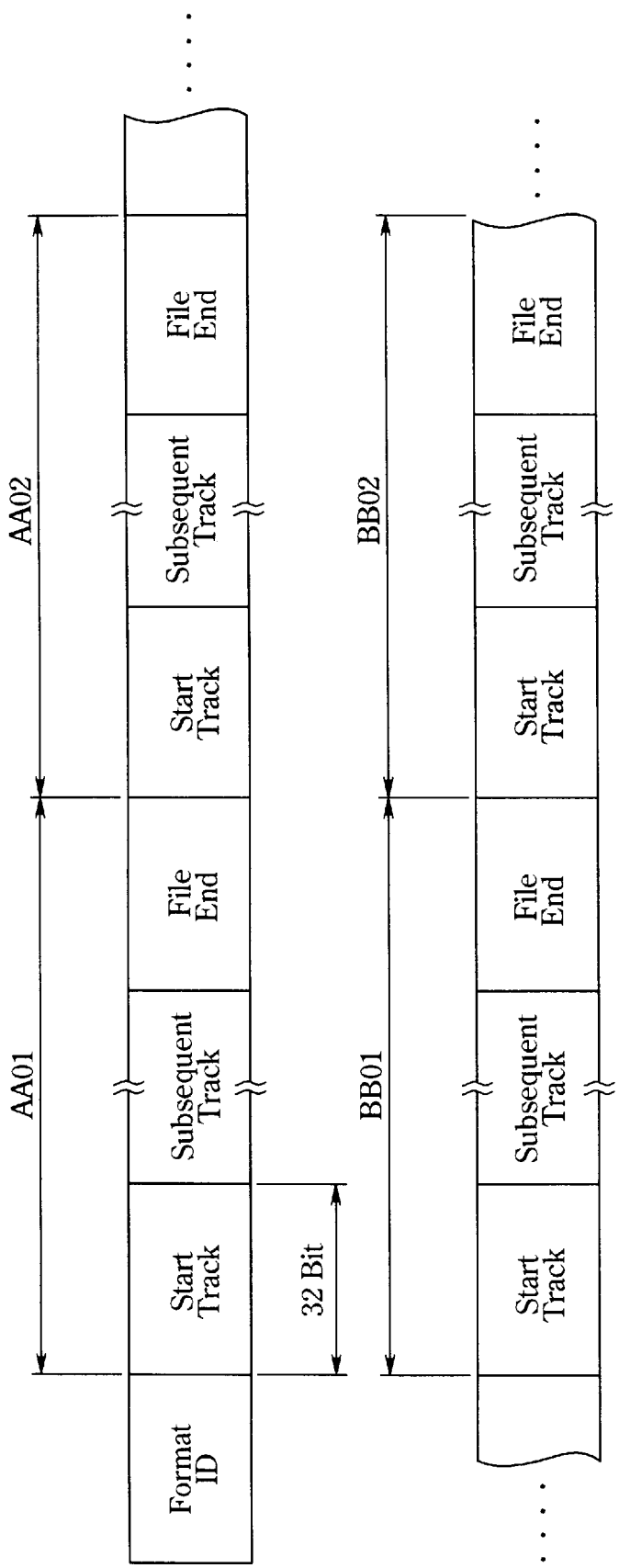
FIG. 34 is a view for explaining management information indicating actual recording positions of the respective files.

Further, data trains in which track numbers of tracks where respective files are recorded are successively arranged (allocated) are formed in correspondence with the start tracks every respective file, and management information for carrying out management of recording positions of respective files are formed from the data trains with respect to the respective files as shown in FIG. 34.

Reference is made to such management information in carrying out recording/reproduction of file. For example, in carrying out recording of file, an approach is employed to carry out recording with respect to unused (not yet used) tracks by making reference to this management information thus to prevent that overwrite recording is carried out with respect to tracks where other files have been already recorded. On the other hand, in carrying out reproduction of file, an approach is employed to reproduce file by making reference to the management information similarly to that at the time of recording, thereby making it possible to reproduce file also in the case where tracks where respective files are recorded are continuous by updating of file, etc.

User Partition Note of the field F6 is formed by user data area F6*a* (User Data for every Partition) prepared correspondingly for every partition recorded on the magnetic tape.

(b) System Log Area

The system log area F5*a* will now be described. The system log area F5*a* is caused to form the area of partition information (field F5) as previously described, and is formed in correspondence with individual partitions recorded on the magnetic tape 12. In this case, when plural partitions recorded on the magnetic tape exist, information relating to partition is stored into the system log area F5*a*. If single partition exists, information of the system log area F5*a* is information relating to the entirety of the magnetic tape. It is to be noted that the following explanation will be given on the premise of the former case where information relating to partition is stored in the system log area F5*a*.

The data structure of one system log area F5*a* is defined as shown in the FIG. 31 mentioned above, for example, and is formed by fields F101–F115 in this case.

In these fields F101–F115, the first field F101 is caused to be the area of Previous Groups written. In this area, information of the number of groups within corresponding partition physically recorded with respect to the magnetic tape starting from the time when corresponding system log area F5*a* has been updated last is indicated. Moreover, the field F102 is caused to be the area of Total Groups written, and total number of groups recorded with respect to corresponding partition until now is indicated. This value is integrated, e.g., until the tape cassette reaches the life time so that it cannot be used or it is subjected to disposal.

With respect to respective areas of the Previous Groups written and the Total Groups written, e.g., if data is being recorded with respect to the magnetic tape 12 by the tape streamer drive, values of those areas are respectively incremented in correspondence with the number of groups newly recorded by the current recording operation.

The field F103 is caused to be the area of Previous Groups read, and the number of groups where read-out operation has been physically carried out starting from the time when corresponding log area F5*a* has been updated last is indicated. The field F104 is caused to be the area of Total Groups read, and integrated value of the number of groups which have been read out from corresponding partition is indicated.

The field F105 is caused to be the area of Total Rewritten frames.

Meanwhile, in the tape streamer drive of this embodiment, the reproduction magnetic heads Hr1, Hr2 are provided in the state arranged on the rotary drum 131 so that they have the positional relationship preceding by a predetermined number of tracks with respect to the recording magnetic heads Hw1, Hw2. At the time of recording, recording is carried out in frame (2 tracks) units onto the magnetic tape 12 by the two recording magnetic heads Hw1, Hw2. In this case, the reproduction magnetic heads Hr1, Hr2 carry out read-out operation of data from the frame previously written with respect to the magnetic tape 12 by the recording magnetic heads Hw1, Hw2. Such an operation is called READ-AFTER-WRITE (hereinafter referred to as RAW in an abbreviated form). Data of the frame which has been read out by RAW is caused to undergo detection of error rate by the system controller 161. In the case where it is detected that error takes place, control of the recording system is carried out so as to carry out re-write operation of data of the frame where that error has taken place.

The total Rewritten frame of the field F105 indicates the value obtained by integrating the number of frames for which data rewrite request has been made on the basis of the RAW in the corresponding partition.

The field F106 is caused to be the area of Total 3rd ECC count. In the tape streamer drive system of this embodiment, error correction is carried out by parity of C1, C2, C3 with respect to the data which have been read out from the magnetic tape 12. The C3 parity is used in the case where recovery of data cannot be made only by the C1, C2 parity. This Total 3rd ECC count indicates the value obtained by integrating the number of groups where error correction has been made by using the C3 parity in the corresponding partition.

The field F107 is caused to be the area of Load count, and value obtained by integrating the number of loads of the tape is indicated therein.

The field F108 is the area of Access count, and the number of access operations that the tape streamer drive has provided with respect to corresponding partition is indicated therein.

The field F109 is caused to be the area of Previous rewritten frames, and information of the number of frames within the partition for which data rewrite request has been made starting from the time when corresponding log area F5a is updated last by the previously explained RAW is indicated therein.

The field F110 is caused to be the area of Previous 3rd ECC count, and the number of groups where error correction has been carried out by using the C3 parity starting from the time when corresponding system log area 5a is updated last is indicated therein.

The field F111 is caused to be the area of ID Map number, and information of definition number of index for search is stored therein. In the case of this embodiment, this ID Map number is set to "0" (zero) at all times as the value.

In Valid Max. Absolute frame count of the field F112, information of frame count up to the last frame considered to be valid within corresponding partition is indicated. In the area of Max. Absolute frame count of the field F113, information of the last frame count of corresponding partition is indicated.

Moreover, in the area of Updata Replace count of the field F114, information obtained by integrating rewrite operations of data with respect to the magnetic tape within corresponding partition by update is indicated.

In the area of Flags of the last field F115, e.g., data such as flag indicating write enable/inhibit and read enable/inhibit with respect to corresponding partition, and rewrite enable/inhibit of data based on RAW at the time of recording, and/or flag indicating that any processing is being carried out at present with respect to corresponding partition by the tape streamer drive, etc. are stored.

Meanwhile, as previously explained with reference to FIG. 22, system log areas are provided at the leading portions every partitions on the magnetic tape 12. In the system log area provided on the magnetic tape 12, information content similar to that of the system log area F5a of the MIC 11 shown in the FIG. 31 mentioned above can be recorded by similar data structure. Namely, in the data storage system of this embodiment, areas where system log information can be stored are provided with respect to both the MIC 11 and the magnetic tape 12.

7. Access example of recording/reproduction unit (a) Access example in the case where there is no MIC An access operation example with respect to the magnetic tape at the time of recording/reproduction by the tape streamer drive shown in FIG. 20 as the data storage system of this embodiment which has been explained will be described below with reference to FIGS. 35 to 39.

Meanwhile, while it has been described that the data storage system of this embodiment corresponds to the tape cassette 10 provided with the MIC 11, this data storage system is caused to have general usability so as to permit recording/reproduction operation in a manner to correspond to the tape cassette provided with no MIC 11 as well. In view of this, an access operation example of the tape streamer drive in the case where the data storage system corresponds to the tape cassette provided with no MIC 11 will be first described with reference to FIG. 35.

Figure 35:
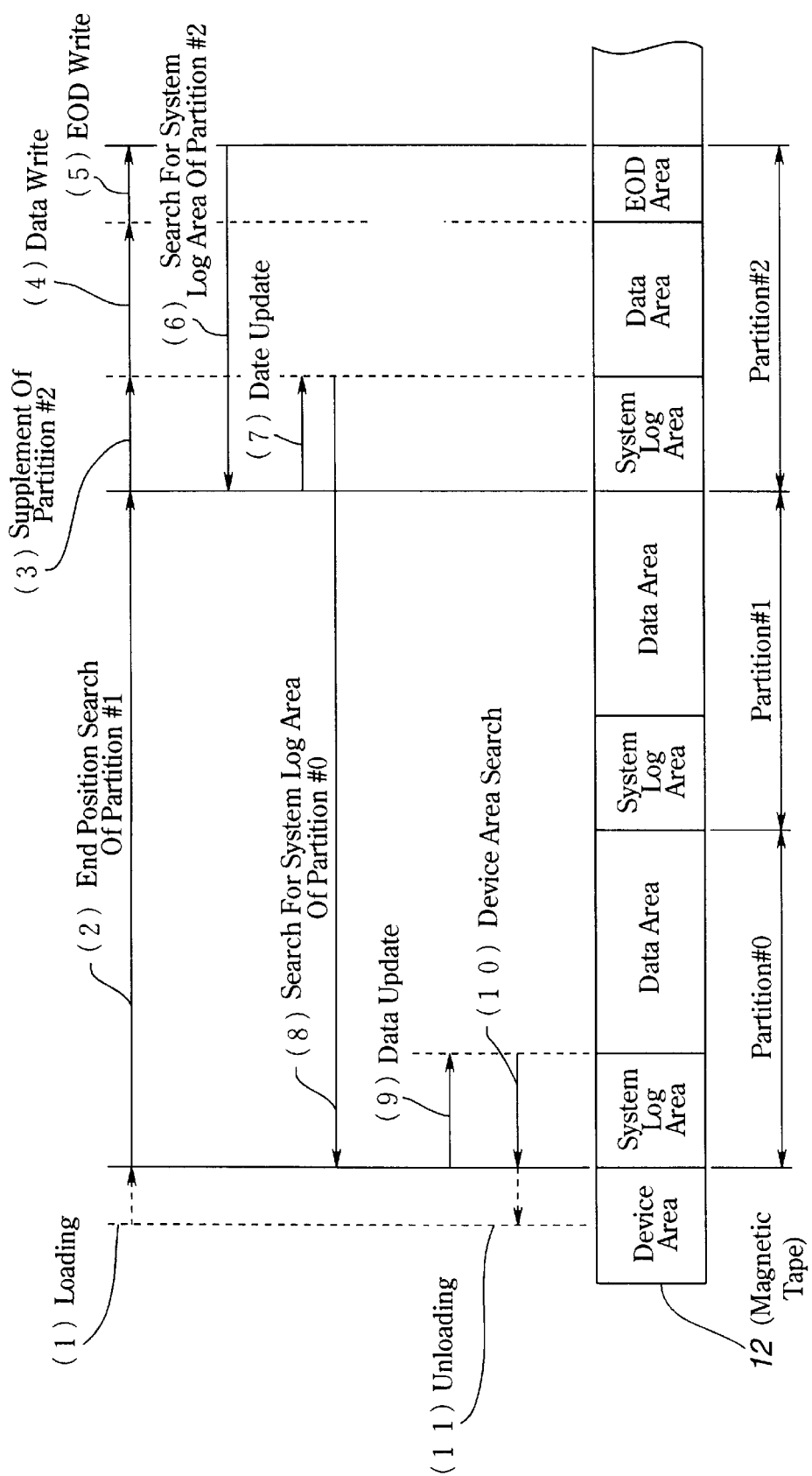
FIG. 35 is an explanatory view showing an access example with respect to magnetic tape.

Data recorded onto the magnetic tape 12 is shown in a model form in FIG. 35. In this case, subsequently (succeedingly) to Device Area (see FIG. 22) provided at the leading portion of the magnetic tape 12, partitions #0, #1, #2 are indicated. An access operation of the tape streamer drive in the case of newly record in a supplementary manner, with respect to the magnetic tape 12 of the tape cassette provided with no MIC, partition #2 from the state where partitions #0, #1 have been already recorded will now be described with reference to the FIG. 35 mentioned above. In FIG. 35, numbers indicated within the parentheses () indicate order of the access operation of the tape streamer drive.

In the case of the tape cassette where no MIC is provided, loading and unloading of the magnetic tape 12 are necessarily carried out in the device area of the leading portion of the magnetic tape. In view of the above, as the operation of the tape streamer drive for recording partition #2, loading of the magnetic tape 12 is first carried out in the device area (1), and end position of the partition #1 is then searched while feeding the tape at a high speed (2).

Then, supplementary write-in operation of the partition #2 is carried out from the frame subsequent to the end position of the partition #1. Initially, preparation of System Log Area for partition #2 is carried out (3). At this time, in this example, data of the content of default is recorded in the System Log Area. In this case, the data content and the data structure of the System Log Area are caused to be similar to those of the system log area F5a of the MIC 11 which has been described with reference to FIG. 31.

When write operation of the System Log Area is completed, write operation of data delivered from the host computer 200 side is carried out (4). Thus, Data Area subsequent (succeeding) to the System Log Area is formed. When write operation of data is completed, write operation of EOD area is carried out (5). As the result of the fact that this EOD area is written, it is indicated that valid data area does not exist in the subsequent (succeeding) area of the magnetic tape 12.

In a manner as stated above, the System Log area, the Data Area and the EOD area of the partition #2 are recorded in succession. Thus, there results the state where the area of the partition #2 is physically provided. In this instance, by Area ID (see FIGS. 28, 29) of the ID information areas recorded in respective areas, it is indicated that corresponding areas are respectively the System Log area, the Data Area and the EOD area within the partition #2.

When write operation of the EOD area is completed, the tape streamer drive carries out search operation with respect to the leading portion of the System Log Area of the partition #2 (6). Then, the data content of the field which is to be changed in correspondence with the write operation of the data area (4) and the write operation of the EOD area (5) with respect to the System Log Area of the partition #2 is updated (7).

Meanwhile, in the case where recording/reproduction is carried out in correspondence with the tape cassette provided with no MIC 11, e.g., with respect to the System Log Area of the first partition #0, in place of past record information consisting of only partition #0, data of respective fields F101–F115 are assumed to be handled so as to permit management of use past record information of all partitions recorded on the magnetic tape.

In view of the above, after updating of data of the System Log Area of the partition #2 is carried out, access is provided with respect to the leading portion of the System Log Area of the partition #0 from the end position of this System Log Area (8). Subsequently, updating of data of required field is carried out with respect to the System Log Area of the partition #0 (9) thereafter to provide access to the leading device area of the magnetic tape 12 (10) to carry out unloading at this stage (11).

Accordingly, the data updating operation of the System Log Area of the partition #2 of the access order (7) may be handled as option or may be omitted. In this case, subsequently to write operation of the EOD area, access is provided with respect to the leading portion of the System Log Area of the partition #0 ((5)–(8)).

While the access operation example at the time of reproduction in the case where the tape streamer drive corresponds to the tape cassette provided with no MIC is not illustrated, such operation is assumed to be in conformity with the access operation at the time of recording of the FIG. 35 mentioned above.

Namely, after loading is carried out in the device area of the leading position of the magnetic tape, access to the System Log Area of the partition #0 is once provided to carry out read-out operation of the system log information. Then, access to the System Log Area of a required partition is provided to carry out read-out operation of the system log information thereafter to provide access to Data Area of current partition to carry out read-out operation of data. When such read-out operation is completed, updating of the System Log Area of the current partition is carried out thereafter to provide access to the System Log Area of the partition #0 for a second time to carry out updating of system log information. Thus, unloading is carried out in the device area.

It is to be noted that the format for updating System Log Area every partition is optional, and in the case of the format in which such updating operation is not carried out, the access operation for providing access to the System Log Area of a required partition to carry out read-out/updating of the system log information is omitted.

(b) Access example (1) in the case where MIC is provided

In the above-described access operation at the time of recording corresponding to the tape cassette provided with no MIC of FIG. 35, updating of the System Log Area on the magnetic tape 12 and loading/unloading in the leading device area of the magnetic tape 12 are essential (indispensable). Accordingly, the number of actions for access and/or the total feed quantity of tape are increased by those requirements, and it takes much time in the access operation during one recording/reproduction operation by those requirements.

On the contrary, in the case where recording/reproduction is carried out in correspondence with the tape cassette 10 provided with the MIC 11, as indicated by the feature of this embodiment, in a manner explained below, loading/unloading can be carried out at the middle position on the magnetic tape where recording/reproduction operation of data is assumed to be completed, and updating of data with respect to the System Log Area on the magnetic tape can become unnecessary.

Figure 36:
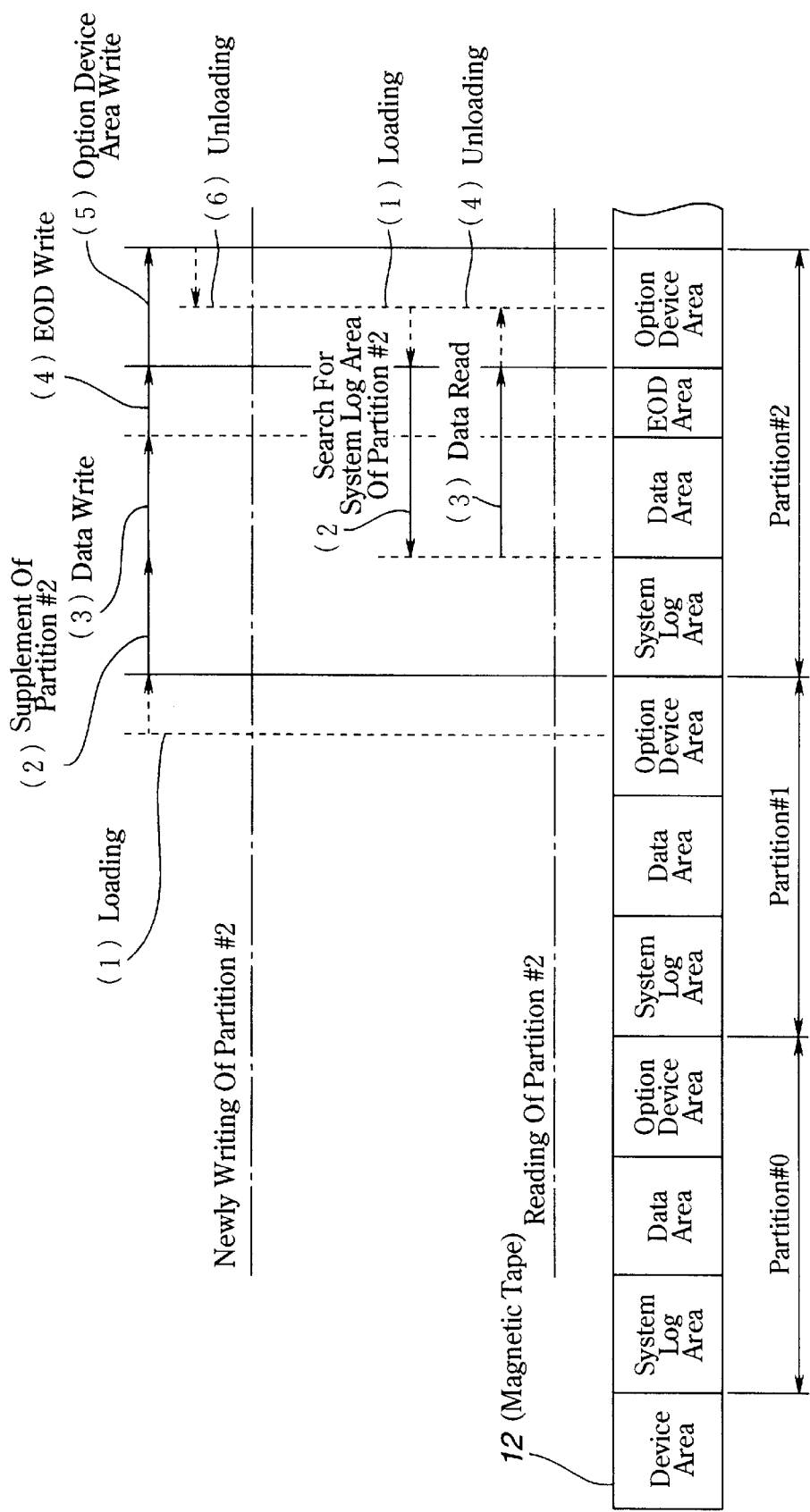
FIG. 36 is an explanatory view showing an access example with respect to magnetic tape as the recording/reproduction unit of this embodiment.

An access operation example of the tape streamer drive at the time of recording and at the time of read-out of data in the case where MIC 11 is provided at the tape cassette 10 is shown in FIG. 36. It is to be noted that the same reference numerals are respectively attached to the same portions as those of FIG. 35, and their explanation is omitted.

Initially, an access operation example in the case where partition #2 is newly written from the state where partitions #0, #1 are recorded on the magnetic tape as the operation at the time of recording shown in the FIG. 36 mentioned above will be described below.

In this case, the last operation of the tape streamer drive with respect to the magnetic tape 12 is assumed to be recording or reproduction operation for partition #1. In this case, the tape streamer drive is assumed to carry out unloading in the Option Device Area of the partition #1 on the magnetic tape 12 at the time of completion of the recording or reproduction operation with respect to the above-mentioned partition #1. Accordingly, loading (1) which is the first operation for newly writing partition #2 is carried out in the option device area of the partition #1.

The Option Device Areas are caused to be device areas provided every partitions, i.e., areas provided for loading/unloading in partition units. For example, in the case where recording of partition is carried out in correspondence with the tape cassette provided with MIC, write operation is assumed to be carried out from the tape streamer drive side as described later.

When loading is carried out in the Option Device Area of the partition #1 in a manner as described above, preparation of System Log Area for partition #2 is first carried out as the write operation of the partition #2 from the frame subsequent (succeeding) to the end position of the Option Device Area of the partition #1 (end position of the Option Device Area of the partition #1 in this case) (2). When write operation of the System Log Area is completed, write operation of data is carried out to form data area (3). When formation of the data area is completed, write operation of the EOD area is carried out (4).

In the case where recording is carried out with respect to the tape cassette provided with MIC as in the case of FIG. 36, when write operation of the EOD area is completed, write operation of the Option Device Area of partition #2 is subsequently carried out (5). In this Option Device Area, e.g., "2 (decimal notation)" is given as partition ID (see FIG. 28) of the ID area A2, and the area ID which has been described with reference to FIG. 29 is caused to be "7 (decimal notation)", whereby it is indicated that corresponding area is the Option Device Area of partition #2.

When write operation of the Option Device Area is completed, the magnetic tape 12 is returned to substantially the intermediate position of the area of the Option Device Area where write operation has been carried out, at which unloading is carried out (6). In this instance, System Log Area F5a corresponding to the partition #2 corresponding to lapse of the recording operation until now is newly prepared with respect to MIC 11 of the tape cassette 10, and is stored into a predetermined area. Moreover, if any area for which rewrite operation is required exists in other data areas of the MIC 11, rewrite operation of data will be carried out. Accordingly, in this case, rewrite operation of the System Log Area on the magnetic tape 12 is not carried out.

Further, at this time, unloading position information is stored into volume information (field F3) of MIC 4. As this information content, e.g., data indicating that corresponding area is the System Log Area of the partition #2 may be used. It is also conceivable to employ absolute position information on the magnetic tape of the unloading position is employed.

Figure 37:
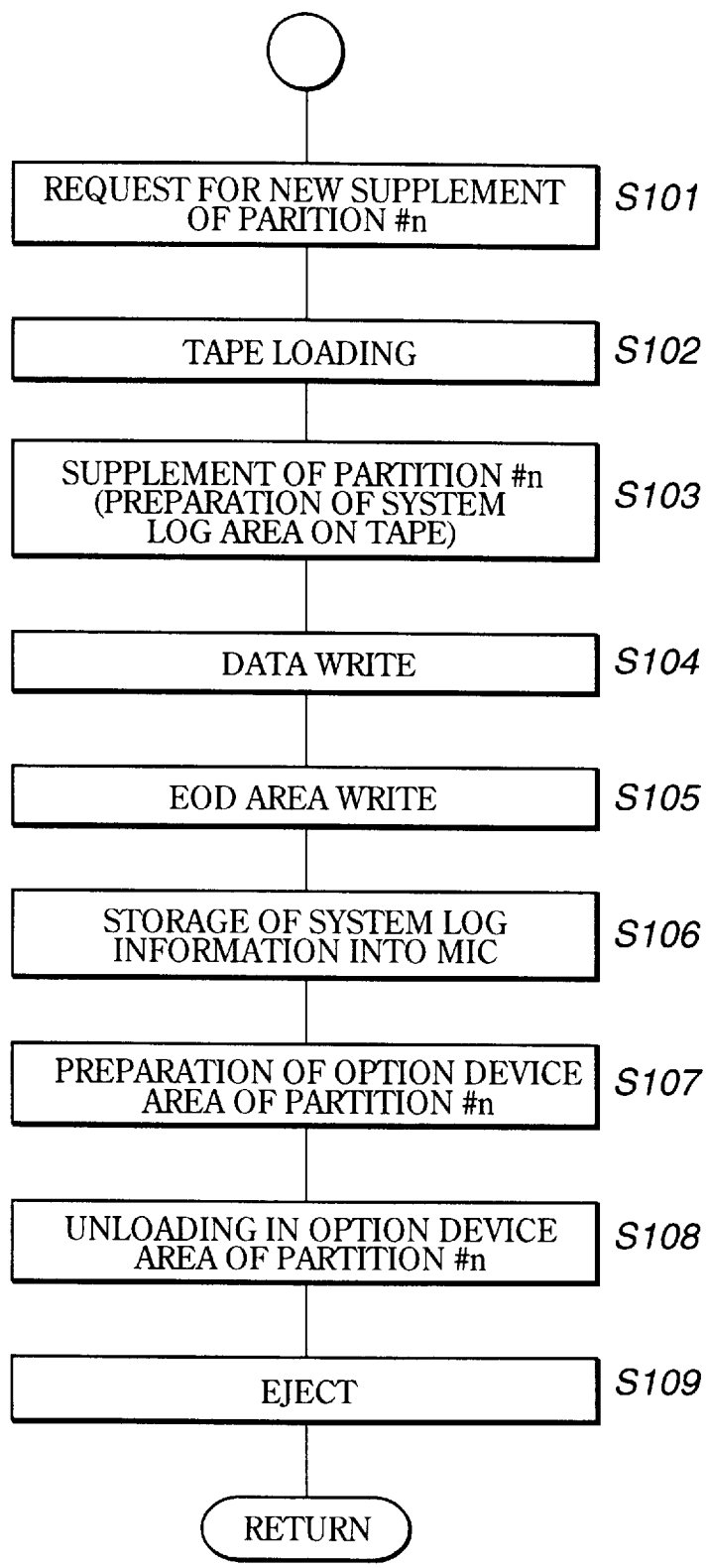
FIG. 37 is a flowchart showing the processing operation of system controller for realizing the access operation shown in FIG. 36.

The processing operation of the system controller 161 of the tape streamer drive for carrying out supplementary recording of partition in a manner as stated above will now be described with reference to the flowchart of FIG. 37.

In this routine, when, e.g., request for new supplement of partition #n is received from the host computer 200 at step S101, the processing operation by the system controller 161 proceeds to step S102 to carry out loading of the magnetic tape from the tape cassette loaded in the tape streamer drive. At step S103, as the supplementary write processing of the partition #n, preparation of the System Log Area is first carried out from the frame subsequent (succeeding) to the end position of partition #(n−1) to subsequently execute write operation of data to form data area (step S104). After write operation of the data area is completed, write operation of EOD area is carried out (step S105).

When the write operation of the EOD is completed, the system controller 161 stores System Log information corresponding to the partition #n newly provided by the processing operation from the step S102 up to the step S105 with respect to the MIC of the tape cassette (step S106). At the subsequent step S107, write operation of Option Device Area subsequent to the EOD area provided at the previously described step S105 is carried out. At the subsequent step S108, the magnetic tape is fed up to substantially the intermediate position of this Option Device Area to carry out unloading. In this case, at the subsequent step S109, eject operation of the tape cassette is carried out.

Moreover, in the case where after the partition #2 has been recorded as explained with the FIG. 36 mentioned above, e.g., data of the partition #2 is read out, such read-out operation is similarly carried out on the basis of the access order indicated at the section of the lower side of FIG. 36.

In this case, as the first operation, loading is carried out in the Option Device Area of the partition #2 which has been caused to undergo unloading at the time of recording of the previously mentioned partition #2 (1) to subsequently provide access to the end position of the System Log Area of the partition #2 on the magnetic tape 12 (2). The system controller 161 makes reference to unloading position information stored in the volume information of the MIC 11 and the Area ID recorded on the magnetic tape to compare target access position and current position to thereby realize the above-mentioned access operation.

Then, access to Data Area subsequent (succeeding) to the System Log Area is provided to carry out read-out operation of recording data (3). Accordingly, access with respect to the System Log Area on the magnetic tape is not provided. However, in this case, the system controller 161 of the tape streamer drive reads out information of the System Log Area F5a of the partition #2 stored in the MIC 11 to utilize it for management of the reproduction operation.

When read-out operation is carried out up to the end position of the EOD area subsequent (succeeding) to the data area is carried out as the read-out operation of recording data, the magnetic tape 12 is returned to substantially the intermediate position of the Option Device Area of the partition #2, at which unloading is carried out (4). At this time, if necessary, updating of unloading position information to be stored into the Volume information of the MIC 11 is carried out.

Comparison between the access example with respect to the magnetic tape of the tape cassette provided with no MIC which has been explained with reference to FIG. 35 and the access example corresponding to the case where MIC 11 is provided which has been explained with reference to FIG. 36 is now made. In the case of FIG. 35, since loading/unloading is caused to be carried out in the device area of the leading portion of the magnetic tape, there was a necessity of necessarily providing access to the device area of the leading portion of the magnetic tape at the time of completion of recording/reproduction with respect to the magnetic tape. For this reason, it takes much time in completion of the recording/reproduction accordingly. Particularly, in such cases that the position of the magnetic tape is close to the termination at the time of completion of recording/reproduction of data, much time is required in access to the device area. Moreover, in this case, at the time of recording/reproduction of data, there was a necessity of providing access to the system log area on the magnetic tape to read out corresponding information.

On the contrary, in the case of FIG. 36, Option Device Areas are provided every respective partitions, thereby making it possible to carry out loading/unloading in this area. Namely, it is possible to carry out loading/unloading at the middle position of the magnetic tape 12 in which recording/reproduction is assumed to be completed.

Thus, it becomes unnecessary to provide access up to the device area of the leading portion of the magnetic tape at the time of completion of recording/reproduction of data, or to provide access up to the recording/reproduction position physically spaced from the device area as in the case of FIG. 35. As a result, the access time is reduced accordingly. Moreover, when an approach is employed to write system log information with respect to the MIC 11, thereby making it possible to eliminate the necessity of providing access to the system log area on the magnetic tape 12 to write data thereinto. By employment of such an approach, the number of actions for access is reduced. For this reason, reduction in the access time is realized.

In the case of FIG. 36, system log areas provided in respective partitions are not used for management of the actual recording/reproduction operation. However, for example, in the case where the MIC is out of order, or the like so that information of the MIC cannot be utilized, it becomes possible to carry out recording/reproduction of data from the leading portion of the magnetic tape by the access operation in conformity with FIG. 35.

(c) Access example (2) in the case where MIC exists

Explanation will now be given with reference to FIG. 38 in connection with the case where rewrite (update) operation of data is carried out within one partition previously recorded on the magnetic tape as the access example of the tape streamer drive corresponding to the tape cassette provided with the MIC.

Figure 38:
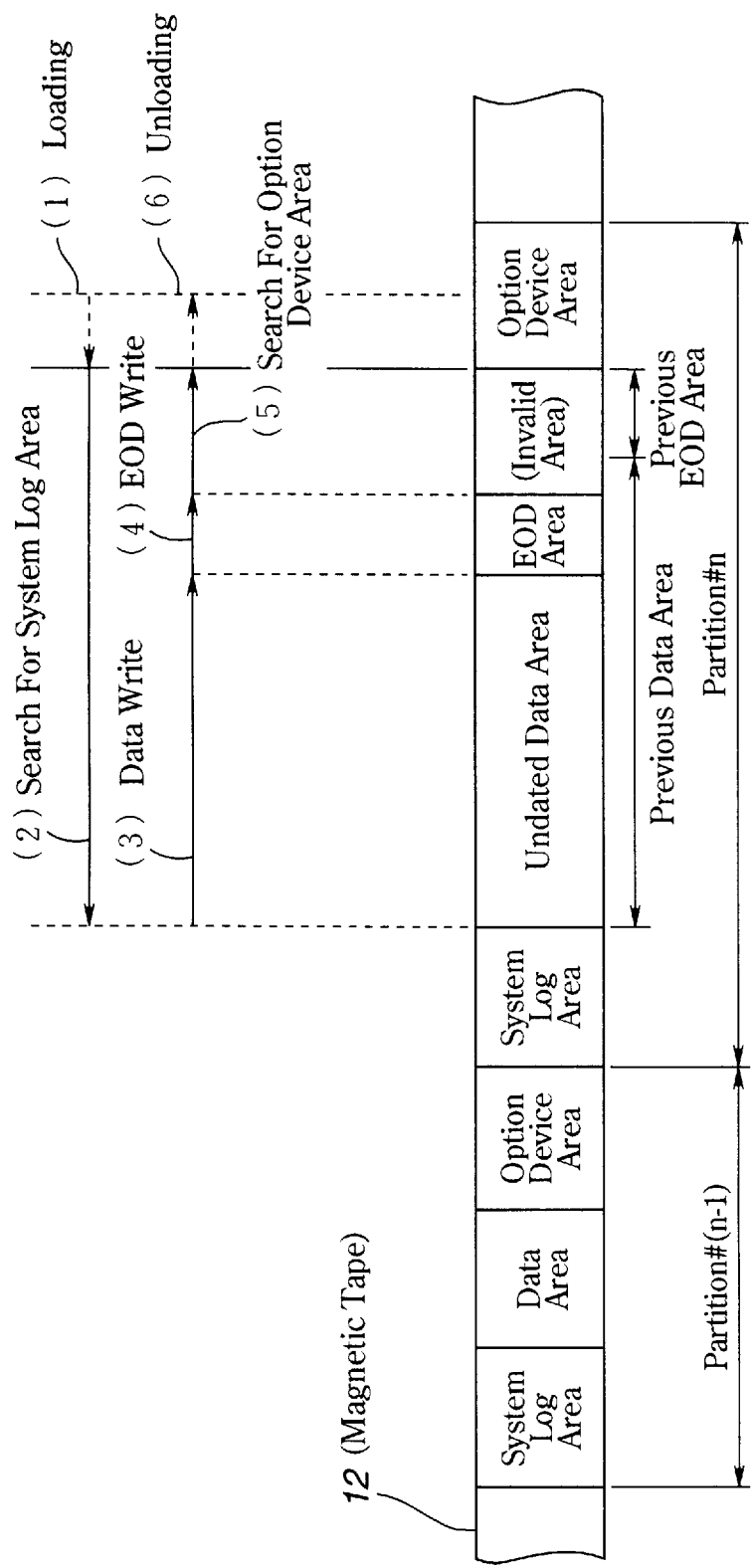
FIG. 38 is an explanatory view showing an access example with respect to magnetic tape as the recording/reproduction unit of this embodiment.

In FIG. 38, an access example in the case where rewrite operation of data is carried out within partition #n is shown. In this case, the last operation of the tape streamer drive with respect to the tape cassette is assumed to be recording or reproduction of the partition #n. Accordingly, as the first access operation, loading is carried out in the Option Device Area of the partition #n as shown in FIG. 38. Thereafter, reference is made to unloading position information stored in the MIC 11 and the Area ID recorded on the magnetic tape 12 to thereby provide access (2) to the end position of the System Log Area of partition #n. It is to be noted that if the last operation of the tape streamer drive with respect to the tape cassette is caused to be recording or reproduction of partition #(n−1), the first loading is carried out in the Option Device Area of the partition #(n−1) to provide access to the end position of the System Log Area of the partition #n. At this time, the system controller 161 of the tape streamer drive is assumed to read out data from the MIC 11 of the tape cassette 10 to store it thereinto.

Thereafter, new data is written in a manner to carry out overwrite operation with respect to the data previously recorded from the subsequent (succeeding) frame of the end position of the system log area of the partition #n. Thus, new data area constituting current data area is formed in the partition #n (3). When write operation of data into the data area is completed, EOD area is newly written (4) to provide access with respect to substantially the intermediate position of the Option Device Area (5), at which unloading is carried out. In this instance, as the processing of the system controller 161 of the tape streamer drive, rewrite operation of data of Table of information to be updated including System Log information or unloading position information, etc. is carried out with respect to the MIC 11 of the tape cassette 10.

In this case, a portion of the previous data area and the previous EOD area are included, as shown in FIG. 38, for example, within the area to be positioned between the newly provided EOD area and the Option Device Area within the partition #n. At this time, data of the above-mentioned area subsequent (succeeding) to the new (current) EOD area is caused to be invalid (invalid area).

(d) Access example (3) in the case where MIC exists

Figure 39:
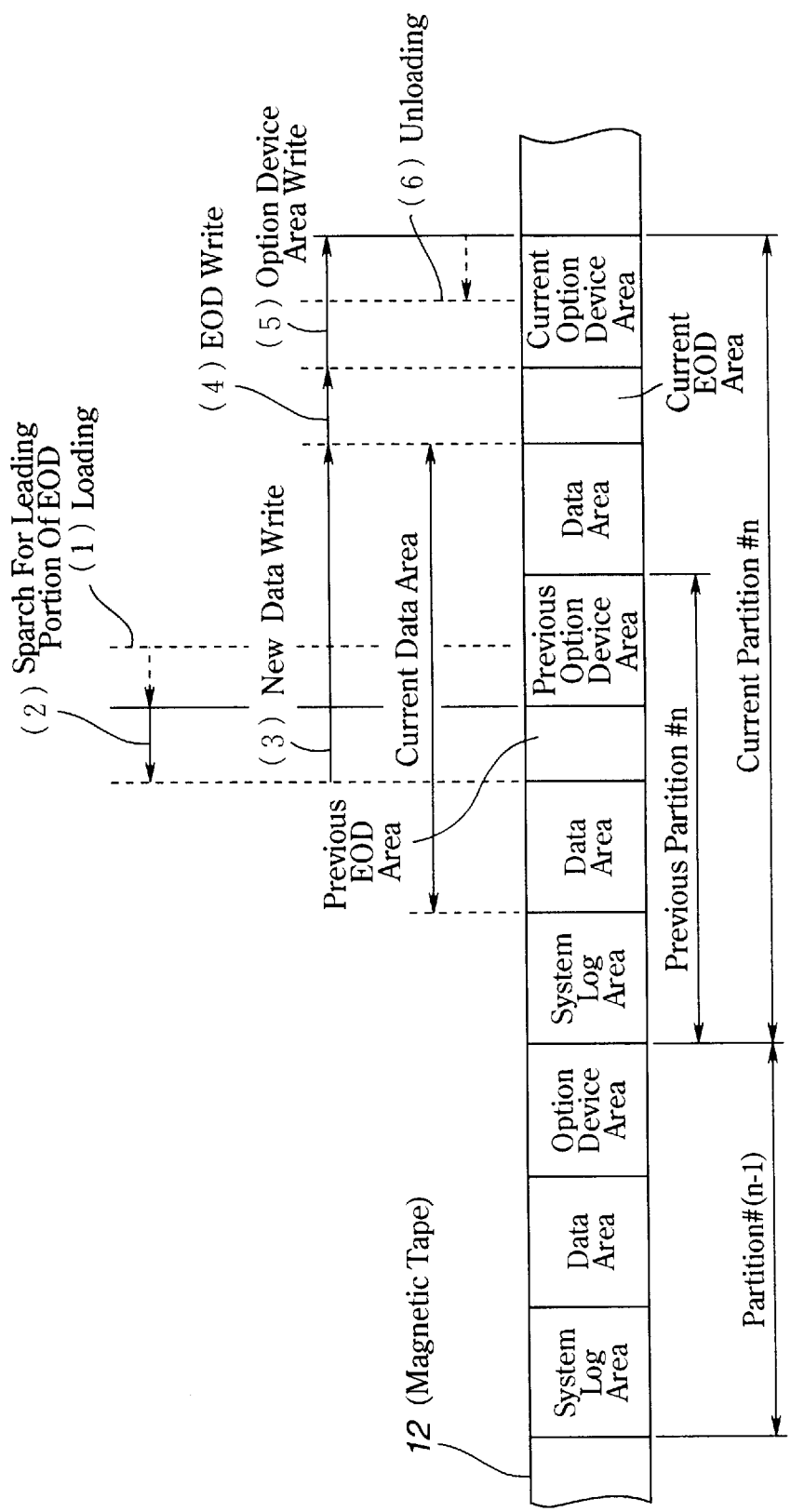
FIG. 39 is an explanatory view showing an access example with respect to magnetic tape as the recording/reproduction unit of this embodiment.

Explanation will now be given with reference to FIG. 39 in connection with the case where data is recorded in a supplementary manner with respect to the partition recorded on the magnetic tape as an access example of the tape streamer drive corresponding to the tape cassette provided with MIC. It is to be noted that, in this case, such a recording operation is carried out on the premise that partition #n shown in FIG. 39 is the last partition on the magnetic tape 12.

In this case, loading is carried out in the previous Option Device Area within the partition (1) to provide access to the leading portion of the previous EOD area (2). Also in this case, the system controller 161 makes reference to the unloading position information stored in the MIC 11 and the Area ID recorded on the magnetic tape 12 to thereby carry out the above-mentioned access operation. Moreover, also in this case, access to the System Log Area on the magnetic tape 12 is not carried, but system log information is read out from the MIC 11 of the tape cassette so that it is taken into the system controller 161 side. Then, new data is supplementarily recorded in a manner to overwrite data from the position of the leading frame of the previous EOD area (3). In this case, supplementary recording of new data is carried out in a manner to extend (go) across the area of the previous Option Device Area from the previous EOD area, and to form data area. Resultantly, "new Data Area (constituting current Data Area)" is formed within the range shown in FIG. 39 by the current data recording operation.

Thereafter, subsequently to the current (new) data area, EOD area is newly written (4) and write operation of Option Device Area is carried out (5). The end position of the Option Device Area is considered to be end position of new partition #n. Then, unloading is carried out substantially at the intermediate position of the Option Device Area (6).

It is to be noted that the form for carrying out this invention is not limited to the configuration shown in respective figures which have been explained, but format and access operation of data, etc. to be recorded or stored with respect to the tape cassette, the tape streamer drive and the MIC may be suitably changed in dependency upon actual use condition, etc.

In addition, while the recording/reproduction system composed of tape cassette for 8 mm VTR with non-volatile memory in which recording/reproduction of digital signals is carried out and tape streamer drive corresponding to the tape cassette have been described as the embodiments which have been explained, this invention is not limited to such implementation, but may be applied as a matter of course also in such cases that the MIC is provided at the tape cassette in a recording/reproduction system which can record/reproduce, e.g., information of video signals or speech signals as digital signals.

What is claimed is:

1. A tape cassette comprising:
    a tape-shaped recording medium including a plurality of partitions, wherein recording data is recorded into each one of said plurality of partitions; and
    memory means for storing attached or subsidiary information relating to each one of said plurality of partitions, said memory means being separate from said tape-shaped recording medium.

2. The tape cassette as claimed in claim 1, wherein each of said plurality of partitions includes:
    a data area where said recording data can be recorded;
    a data end area placed after said data area indicating an end of the data area; and
    a device area where said tape-shaped recording medium can be loaded/unloaded under the control of a recording/reproduction unit.

3. The tape cassette as claimed in claim 2, wherein said data area, said data end area and said device area respectively include area identifications corresponding to the respective areas.

4. The tape cassette as claimed in claim 2, wherein said attached information includes unload information indicating a device area of said partition unloaded last.

5. The tape cassette as claimed in claim 1, wherein said attached information includes:
    a partition number for discriminating among said plurality of partition; and
    a start track number indicating a start track of said partition corresponding to said partition number.

6. The tape cassette as claimed in claim 1, wherein said attached information includes information related to past recording use of said partition.

7. The tape cassette as claimed in claim 1, wherein each one of said plurality of partitions includes a directory, wherein said recording data to be recorded as a file is included in said directory, and wherein said attached information includes a directory and file directory information relating to said file.

8. The tape cassette as claimed in claim 7, wherein said file directory information includes attribute information indicating attribute or a preparation date of said file, start track information indicating a recording start track of said file, or file size information indicating a size of said file.

9. A tape recording apparatus for recording data onto a tape-shaped recording medium of a tape cassette, wherein a tape-shaped recording medium area thereon is divided into a plurality of partitions for recording data and memory mens for storing attached or subsidiary information relating to each one of the plurality of partitions independently from the tape-shaped recording medium, the apparatus comprising:
    input means for inputting recording data to be recorded onto said tape-shaped recording medium;
    read-out means for reading out from said memory means said attached information;
    recording control means for controlling the recording of said recording data on said tape-shaped recording medium based on said attached information read out by said read-out means;
    attached information generating means for generating new attached or subsidiary information appearing during the recording of said recording data onto the tape-shaped recording medium; and writing means for writing into said memory means said new attached information generated by said attached information generating means.

10. The tape recording apparatus as claimed in claim 9, wherein said writing means writes said attached information into said memory means after recording of said recording data onto the tape-shaped recording medium by said recording control means is completed.

11. A tape reproducing apparatus for reproducing recording data from a tape-shaped recording medium of a tape cassette, wherein a tape-shaped recording medium area thereon is divided into a plurality of partitions for recording data, and memory means for storing attached or subsidiary information relating to each one of the plurality of partitions independently from the tape-shaped recording medium, the apparatus comprising:

read-out means for reading out from said memory means said attached information;

reproduction control means for controlling the reproduction of said recording data from said tape-shaped recording medium based on said attached information read out by said read-out means;

attached information generating means for generating new attached or subsidiary information appearing during the reproducing of said recording data from the tape-shaped recording medium;

writing means for writing into said memory means said new attached information generated by said attached information generating means; and output means for outputting reproduction data reproduced by said reproduction control means.

12. The tape reproducing apparatus as claimed in claim 11, wherein said writing means writes said attached information into said memory means after the reproduction of recording data from said tape-shaped recording medium by said reproduction control means is completed.

* * * * *